United States Patent
Uemura et al.

(10) Patent No.: US 8,639,210 B2
(45) Date of Patent: Jan. 28, 2014

(54) MOBILE STATION APPARATUS, BASE STATION APPARATUS, AND MOBILE COMMUNICATION SYSTEM

(75) Inventors: Katsunari Uemura, Osaka (JP); Hidekazu Tsuboi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 337 days.

(21) Appl. No.: 12/997,830

(22) PCT Filed: May 28, 2009

(86) PCT No.: PCT/JP2009/059767
§ 371 (c)(1),
(2), (4) Date: Jan. 14, 2011

(87) PCT Pub. No.: WO2009/150943
PCT Pub. Date: Dec. 17, 2009

(65) Prior Publication Data
US 2011/0105109 A1    May 5, 2011

(30) Foreign Application Priority Data

Jun. 11, 2008  (JP) .................................. 2008-153427

(51) Int. Cl.
*H04M 11/04* (2006.01)
*H04W 36/00* (2009.01)

(52) U.S. Cl.
USPC ........ 455/404.1; 455/436; 455/445; 455/453; 455/521; 455/444

(58) Field of Classification Search
USPC ............... 455/404.1, 436, 445, 453, 521, 444
See application file for complete search history.

(56) References Cited

U.S. PATENT DOCUMENTS

| | | | |
|---|---|---|---|
| 7,574,193 B2 * | 8/2009 | Hulkkonen et al. | 455/404.1 |
| 8,219,100 B2 * | 7/2012 | Bao et al. | 455/444 |
| 2002/0032032 A1 * | 3/2002 | Haumont et al. | 455/436 |
| 2007/0258407 A1 | 11/2007 | Li et al. | |
| 2008/0200146 A1 * | 8/2008 | Wang et al. | 455/410 |

(Continued)

FOREIGN PATENT DOCUMENTS

| | | |
|---|---|---|
| CN | 101330702 A | 12/2008 |
| EP | 2 117 238 A1 | 11/2009 |

(Continued)

OTHER PUBLICATIONS

3GPP TS 36.300 V8.4.0, Mar. 2008; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

(Continued)

Primary Examiner — Wen Huang
(74) Attorney, Agent, or Firm — Birch, Stewart, Kolasch & Birch, LLP

(57) ABSTRACT

When communication of a type, such as a priority call, to be prioritized over a normal call has occurred, appropriate measurement of CSG cells is performed. There is provided a mobile station apparatus applied to a mobile communication system that includes a small base station apparatus which makes only mobile station apparatuses registered in advance accessible in normal case, and on the other hand, makes unregistered mobile station apparatuses accessible in non-normal case, wherein the mobile station apparatus is provided with at least: a cell information management section 103 that outputs cell type determination information for distinguishing a normal base station apparatus from a small base station apparatus; and a reception signal processing section 102 that selects whether or not to perform measurement of a channel state between the mobile station apparatus and the small base station apparatus, based on cell type determination information and access-class information indicating a priority of communication, and performs measurement of the channel state according to the selection result.

10 Claims, 18 Drawing Sheets

(56) References Cited

U.S. PATENT DOCUMENTS

2009/0213809 A1    8/2009   Kwon et al.
2010/0029283 A1    2/2010   Iwamura
2010/0130205 A1*   5/2010   Jung et al. .................. 455/435.2

FOREIGN PATENT DOCUMENTS

| WO | WO 2006/123863 A3 | 11/2006 |
| WO | WO 2007/129198 A2 | 11/2007 |
| WO | WO 2008/081816 A1 | 7/2008 |

OTHER PUBLICATIONS

3GPP TS 36.331 V8.1.0, Mar. 2008; 3rd Generation Partnership Project; Technical Specification Group Radio Access Network; Evolved Universal Terrestrial Radio Access (E-UTRA); Radio Resource Control (RRC); Protocol specification (Release 8).

Ishii et al., "Investigation of mobility management in the fixed and radio convergence network employing cellular femto cells", IEICE Technical Report, Feb. 28, 2008, vol. 107, No. 525, pp. 91-96, IN2007-174.

NTT DoCoMo, Inc.,"Cell ID Assignment for Home Node B", 3GPP TSG RAN WG2 Meeting #59, R2-073374, Athens, Greece, Aug. 20-24, 2007.

Samsung, "Measurement of home & private eNBs", 3 GPP TSG-RAN2 Meeting #59, R2-073307, Athens, Greece, Aug. 20-24, 2007.

LG Electronics Inc., Measurements on CSG cells, 3GPP TSG-RAN WG2 #62 R2-082526, May 5-9, 2008, p. 1-3.

* cited by examiner

US 8,639,210 B2

MOBILE STATION APPARATUS, BASE STATION APPARATUS, AND MOBILE COMMUNICATION SYSTEM

TECHNICAL FIELD

The present invention relates to a mobile communication technology including a small base station apparatus that makes only mobile station apparatuses registered in advance accessible in normal case, and on the other hand, makes unregistered mobile station apparatuses accessible in non-normal case.

BACKGROUND ART

Conventionally, discussions have been made on small base station apparatuses to be installed in homes or offices. A small base station apparatus is used for connection with fixed lines for homes to widen the communication area or provide user-specific services. A small base station apparatus according to the standardization group 3GPP (3rd Generation Partnership Project) is called a home node B (or a home (e) node B). Among home nodes B, a home node B that limits users who can use the node by prior registration of access-permitted users, is particularly called a CSG (Closed Subscriber Group) cell (Non-Patent Document 1).

In 3GPP, a discussion is progressing on a CSG cell for 'EUTRA (Evolved Universal Terrestrial Radio Access)' having been evolved from the third generation mobile communication system and 'Advanced EUTRA' advanced therefrom. Unless a mobile station apparatus can distinguish among CSG cells for which subscribers are registered, CSG cells for which subscribers are not registered, and normal cells, the mobile station apparatus tries access to inaccessible CSG cells, resulting in a waste of power consumption and radio resources.

Further, because handover to a cell other than the registered CSG cells is not normally permitted for a mobile station apparatus, it is necessary for the mobile station apparatus to recognize a type of the cell in advance. As methods for a mobile station apparatus to distinguish CSG cells from normal cells, there are proposed methods, including a method that includes a CSG cell identifier in broadcast information (section 6.3.1 of Non-Patent Document 2), a method that performs distinguishing with a cell ID judged by a synchronization signal (Non-patent Document 3), and a method that allocates to a CSG cell a frequency different from that to a normal cell (Non-patent Document 4).

FIG. 17 is a diagram showing an example of a sequence chart that illustrates the measurement of a neighboring cell and a measurement report by a mobile station apparatus, when a CSG cell is disposed as a neighboring cell. The mobile station apparatus receives a synchronization signal-s (step S1701), a downlink reference signal-s (step S1702), and broadcast information channel-s (step S1703) from a base station apparatus (source cell), and then starts communication with the source cell (step S1704), wherein the mobile station apparatus and the source cell are in a state of communication with each other (active state).

Herein, the mobile station apparatus obtains CSG cell information from the neighboring CSG cell deployed in the mobile station apparatus (step S1705). CSG cell information is information obtained by the mobile station apparatus from a signal transmitted from a CSG cell by a method according to any one of Non-Patent Documents 2 to 4, to distinguish a normal cell from a CSG cell. For example, in Non-Patent Document 2, CSG cell information indicates a CSG cell identifier of broadcast information. Likewise, in Non-Patent Documents 3 and 4, CSG cell information respectively corresponds to a cell ID and a frequency band.

The mobile station apparatus, in neighboring cell measurement processing (step S1706), recognizes a CSG cell by a CSG cell identifier, eliminates unregistered CSG cells from target base station apparatuses of neighboring cell measurement, and transmits a measurement report, which is a radio signaling message, to the source cell without including the CSG cells in a measurement report message (step S1707). That is, the mobile station apparatus does not perform measurement processing of downlink reference signals of the unregistered CSG cells.

FIG. 18 is a diagram showing an example of a flowchart illustrating the operation of the mobile station apparatus in the measurement processing of neighboring cells. The mobile station apparatus receives neighboring cell signals from the neighboring cells (step S1801). From a result of reception and demodulation of the neighboring cell signals, it is determined by CSG cell identifiers whether unregistered CSG cells are included in the neighboring cells (step S1802), and when unregistered CSG cells are included, the measurement processing of the downlink reference signals of the CSG cells is stopped on the unregistered CSG cells (step S1803). On the other hand, when it is determined that no unregistered CSG cells are included in step S1802, then the measurement processing of measurement signals is executed on all the neighboring cells (step S1804).

PRIOR ART DOCUMENTS

Non-Patent Documents

Non-Patent Document 1: 3GPP TS36.300, Overall description; Stage 2. V8.4.0 http://www.3gpp.org/ftp/Specs/html-info/36300.htm Non-Patent Document 2: 3GPP TS36.331, Radio Resource Control (RRC); Protocol specification. V8.1.0 http://www.3gpp.org/ftp/Specs/html-info/36331.htm Non-Patent Document 3: NTT DoCoMo, R2-073374, 3GPP TSG-RAN2 Meeting #59, Athens, Greece, 20-24 Aug. 2007

Non-Patent Document 4: Samsung, R2-073307, 3GPP TSG-RAN2 Meeting #59, Athens, Greece, 20-24 Aug. 2007

DISCLOSURE OF THE INVENTION

Summary of the Invention

Problems to be Solved by the Invention

In conventional technologies as described above, Since a mobile station apparatus does not report on unregistered CSG cells, unnecessary measurement of CSG cells and unnecessary handover are restricted, and the power consumption by the mobile station apparatus is reduced. However, by the conventional technologies, even for communication of a type to be prioritized over normal calls at the time of originated call of a priority call (emergency call or emergency communication) or at the time of handover, the measurement result of CSG cells is not reported to a base station apparatus. Consequently, even when the radio quality of a CSG cell in the vicinity is adequate, the mobile station apparatus cannot select the CSG cell as a handover destination. As a result, there is a problem that the range of coverage decreases and the probability of call loss and call disconnection increases.

The present invention has been developed in view of these circumstances, and an object thereof is to provide a mobile station apparatus, a base station apparatus, and a mobile communication system capable of realizing a measurement method of a CSG cell which is appropriate in a case where communication of a type, such as a priority call, to be prioritized over normal calls has occurred.

Means for Solving the problems (1) To attain the above-described object, the following means have been devised in the invention. That is, a mobile station apparatus in accordance with the invention is a mobile station apparatus applied to a mobile communication system that includes an access-restricted base station apparatus for performing communication with a mobile station apparatus registered in advance and a mobile station apparatus in a priority call communication, wherein the mobile station apparatus determines, based on a priority of the communication of the mobile station apparatus, whether or not to transmit a measurement result of a transmission signal from the access-restricted base station apparatus as measurement report information, the measurement result being used for mobility control of the mobile station apparatus in communication.

(2) Further, in the mobile station apparatus in accordance with the invention, the mobile station apparatus, if the priority of the communication is high, transmits the measurement result of the transmission signal from the access-restricted base station apparatus as the measurement report information, and on the other hand, if the priority of the communication is low, does not transmit the measurement result of the transmission signal from the access-restricted base station apparatus as the measurement report information.

(3) Still further, in the mobile station apparatus in accordance with the invention, in a case of performing reconnection, the mobile station apparatus determines whether or not the access-restricted base station apparatus is selectable as a reconnection cell, based on the priority of the communication having been performed just before the reconnection.

(4) Yet further, in the mobile station apparatus in accordance with the invention, the mobile station apparatus, if the priority of the communication is high, determines the access-restricted base station apparatus to be selectable as the reconnection cell, and on the other hand, if the priority of the communication is low, determines the access-restricted base station apparatus to be not selectable as the reconnection cell.

(5) Further, in the mobile station apparatus in accordance with the invention, when the mobile station apparatus determines the access-restricted base station apparatus to be selectable as the reconnection cell and the transmission signal from the access-restricted base station apparatus has a best reception quality, the mobile station apparatus selects the access-restricted base station apparatus as the reconnection cell.

(6) Still further, a mobile station apparatus in accordance with the invention is a mobile station apparatus applied to a mobile communication system that includes an access-restricted base station apparatus for performing communication with a mobile station apparatus registered in advance and a mobile station apparatus in a priority call communication, wherein the mobile station apparatus, when having received, from a base station apparatus in a priority call communication, priority-call control information indicating the access-restricted base station apparatus to be selectable as a base station apparatus of handover destination, determines the access-restricted base station apparatus to be selectable as a handover destination cell.

(7) Yet further, a base station apparatus in accordance with the invention is a base station apparatus applied to a mobile communication system that includes an access-restricted base station apparatus for performing communication with a mobile station apparatus registered in advance and a mobile station apparatus in a priority call communication, the base station apparatus comprising: a priority-call control information generation section that, when access-class information indicating a priority of communication of the mobile station apparatus includes information indicating a priority call as a call type, generates priority-call control information at least indicating the access-restricted base station apparatus to be selectable as a base station apparatus of a handover destination; and a transmission section that transmits the priority-call control information to the mobile station apparatus.

(8) Further, a mobile communication system in accordance with the invention is a mobile communication system, comprising: an access-restricted base station apparatus for performing communication with a mobile station apparatus registered in advance and a mobile station apparatus in a priority call communication; a mobile station apparatus according to any one of Claim 1 to 5; and a base station apparatus.

(9) Still further, a mobile communication system in accordance with the invention is a mobile communication system, comprising: an access-restricted base station apparatus for performing communication with a mobile station apparatus registered in advance and a mobile station apparatus in a priority call communication; a mobile station apparatus according to Claim 6; and a base station apparatus according to Claim 7.

Advantages of the Invention

According to the invention, selection as to whether or not to perform measurement of the channel state between a mobile station apparatus and a small base station apparatus is made, depending on the priority of communication. Accordingly, unnecessary measurement of the channel state between the mobile station apparatus and the small base station apparatus and unnecessary handover are restricted, and the power consumption by the mobile station apparatus is reduced, and on the other hand, necessary measurement of the channel state between the mobile station apparatus and the small base station apparatus can be performed. As a result, the range of coverage can be widened, and a call loss and a call disconnection can be avoided.

BEST MODES FOR CARRYING OUT THE INVENTION

Figure 1:
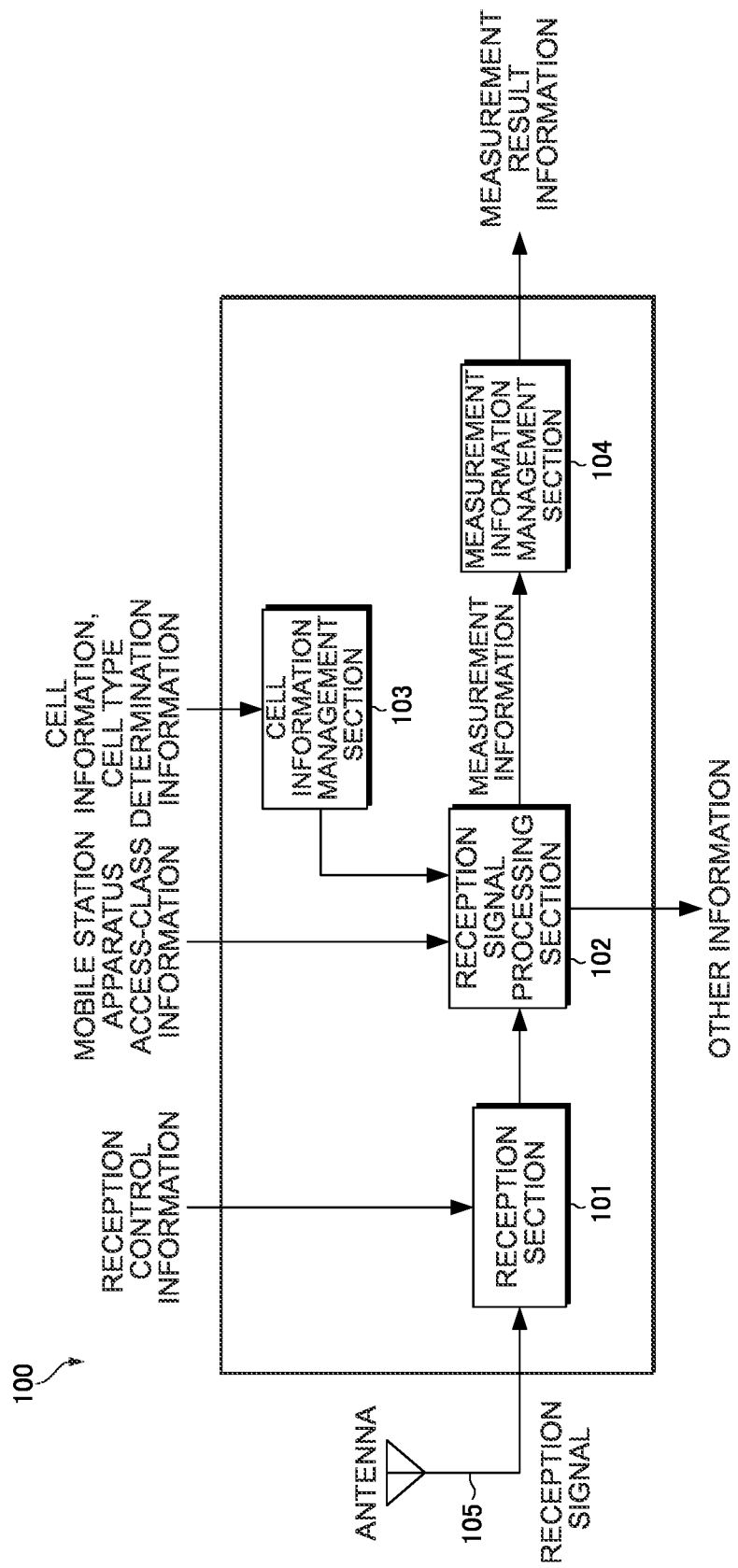
FIG. 1 is a block diagram showing an example of a reception device of a mobile station apparatus in a first embodiment in accordance with the invention.

Next, embodiments in accordance with the invention will be described, referring to the drawings. Physical channels used in EUTRA and Advanced EUTRA include a broadcast information channel, uplink data channel, downlink data channel, downlink shared control channel, uplink shared control channel, random access channel, synchronization signal, downlink reference signal, and the like. It is possible that more physical channels will be added or the channel structure will be modified in the future, however, the description of respective embodiments in accordance with the invention will not be affected, and accordingly description about it will be omitted. Further, reference signals include downlink reference signals and uplink reference signals. Because the physical channels related to the respective embodiments in accordance with the invention are synchronization signals, broadcast information channels, and downlink reference signals, description of details of other physical channels will be omitted.

Synchronization signals are used by a base station apparatus to detect a mobile station apparatus immediately. Synchronization signals include three kinds of primary synchronization signals and secondary synchronization signals in which 31 kinds of codes are alternately allocated, wherein cell IDs in a number of 504 for identification of base station apparatuses and frame timings for radio synchronization are shown by combination of the primary synchronization signals and the secondary synchronization signals.

A broadcast information channel (BCH: Broadcast Channel) is transmitted for a purpose of notifying a control parameter to be used commonly by mobile station apparatuses in a cell. Further, BCH is categorized into P-BCH (Primary BCH) and D-BCH (Dynamic BCH). As it is predetermined that P-BCH is transmitted with a certain cycle in terms of time/frequency, and accordingly a mobile station apparatus can receive P-BCH of a cell whose cell ID has been identified. On the other hand, as for D-BCH, transmission resource thereof is notified using a downlink shared control channel, and the transmission resource can also be made variable for individual cells. D-BCH includes global IDs (called also global cell IDs) in a number at least greater than the number of cell IDs and allocated by one for each cell, and area information (called also a tracking area or a tracking area ID).

Downlink reference signals are pilot signals transmitted from respective cells with a certain electrical power in principle. Further, downlink reference signals are periodically repeated at a certain temporal interval (for example, one frame). The mobile station apparatus receives downlink reference signals at the certain temporal interval, measures the reception qualities, and thus uses the downlink reference signals to determine the reception qualities of the respective cells. Still further, the downlink reference signals are used as reference signals for demodulation of downlink data transmitted simultaneously with the downlink reference signals. Arbitrary sequence may be used for the downlink reference signals as long as the sequences are uniquely distinguishable for the respective cells. Downlink reference signals may be described as DL-RS whose purpose and meaning are the same.

First Embodiment

FIG. 1 is a block diagram showing an example of a reception device of a mobile station apparatus in a first embodiment in accordance with the invention. This reception device 100 includes a reception section 101, a reception signal processing section 102, a cell information management section 103, a measurement information management section 104, and an antenna 105. A reception signal (a transmission signal from the base station apparatus) is received by the reception section 101 via the antenna 105. In the reception section 101, the reception signal is demodulated based on reception control information indicating the channel schedule. The reception control information includes reception timings related to the respective channels, a multiplexing method, resource allocation information, and information related to demodulation. According to the reception control information, the reception section 101 demodulates/decodes the reception signal for each channel and outputs the signal to the reception signal processing section 102.

Cell information and cell type determination information are input to the cell information management section 103. Cell information includes information capable of uniquely identifying a CSG cell for which the mobile station apparatus is registered and cell type determination information for distinguishing normal cells from CSG cells. CSG cells for which the mobile station apparatus is registered are listed and the list includes all or a part of, for example, area information, a CSG cell ID (also called a CSG ID), a frequency, a bandwidth, a global ID, a communication system, GPS information, an IP address, and other information. These pieces of information may be prepared in plural sets when the mobile station apparatus is registered in plural CSG cells, and further, an arbitrary method can be used as the registration method. A suitable part, of the mobile station apparatus, for storing the cell information is a memory in a SIM (Subscriber Identity Module) card, however, not limited thereto.

Further, cell type determination information includes information for distinguishing CSG cells from normal cells. For example, all or a part of information on a cell ID used only for a CSG cell, a frequency band, the correspondence relationship between a CSG cell identifier obtained from broadcast information and the cell ID, and the like, is included. The cell information management section 103 outputs these pieces of information to the reception signal processing section 102.

Further, mobile station apparatus access-class information is input to the reception signal processing section 102, as necessary. Mobile station apparatus access-class information is information for determination of the priority to be applied when the mobile station apparatus performs communication. For example, for a dedicated mobile station apparatus used for maintenance by an operator, a priority higher than that of a mobile station apparatus generally and commercially available. Further, a priority is set also depending on the type of a call, and the priorities of priority calls (emergency calls such as No. 110, No. 119, etc. in the case of Japan) are set higher than those of ordinary communications. The higher the priority, the shorter the waiting time for transmission in originating a call and the higher the priority allocated to radio resources. In addition, a communication control such as to perform data communication with a higher transmission power and a higher reception power, which is different from that for ordinary calls, is applied.

the reception signal processing section 102 processes an input signal from the reception section 101 appropriately for each channel, and particularly performs measurement processing based on the mobile station apparatus access-class information, the cell information, and the cell type determination information having been input, thereby outputting necessary measurement information to the measurement information management section 104. This 'measurement information' includes a cell ID detected from a synchronization signal, the reception quality of a downlink reference signal, and area information obtained from broadcast information. The reception signal processing section 102 determines whether to obtain the measurement information on the CSG cell, depending on the mobile station apparatus access-class information.

Information other than the measurement information processed by the reception signal processing section 102, for example, traffic data of the user and the downlink control data, is input to individual processing blocks as other information, however, description thereof will be omitted because it is not related to the invention.

The measurement information management section 104 manages measurement information for each cell, and notifies an upper level layer of the measurement information as measurement result information at an appropriate timing.

Figure 2:
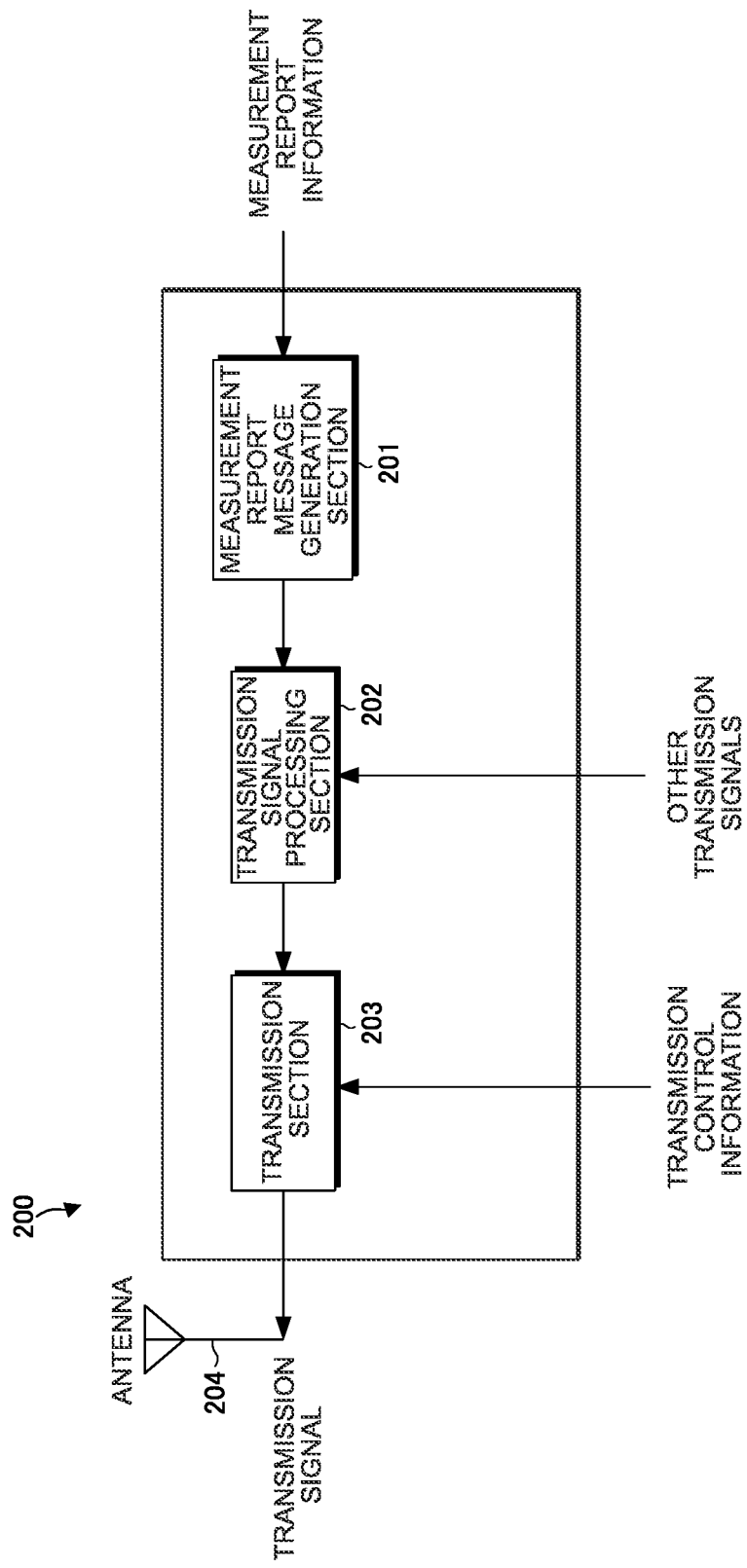
FIG. 2 is a block diagram showing an example of a transmission device of the mobile station apparatus in the first embodiment in accordance with the invention.

FIG. 2 is a block diagram showing an example of a transmission device of the mobile station apparatus in the first embodiment in accordance with the invention. The transmission device 200 includes a measurement report message generation section 201, a transmission signal processing section 202, a transmission section 203, and an antenna 204. To the measurement report message generation section 201, measurement report information is input at an appropriate timing, according to an instruction by the upper level layer. The measurement report message generation section 201 generates a measurement report message, based on the measurement report information, and outputs the message to the transmission signal processing section 202.

The transmission signal processing section 202 performs appropriate scheduling for the measurement report message from the measurement report message generation section 201 and other transmission signals. Other transmission signals are uplink user traffic data, uplink control data, an uplink reference signal, and the like. Data that is output from the transmission signal processing section 202 based on the scheduling is output from the transmission section 203, according to transmission control information, as a transmission signal via the antenna 204. The transmission control information includes transmission timings related to the respective channels, a multiplexing method, resource allocation information, and information on modulation.

In FIGS. 1 and 2, as the other components of the mobile station apparatus are not related to the present embodiment, the description thereof will be omitted.

Figure 3:
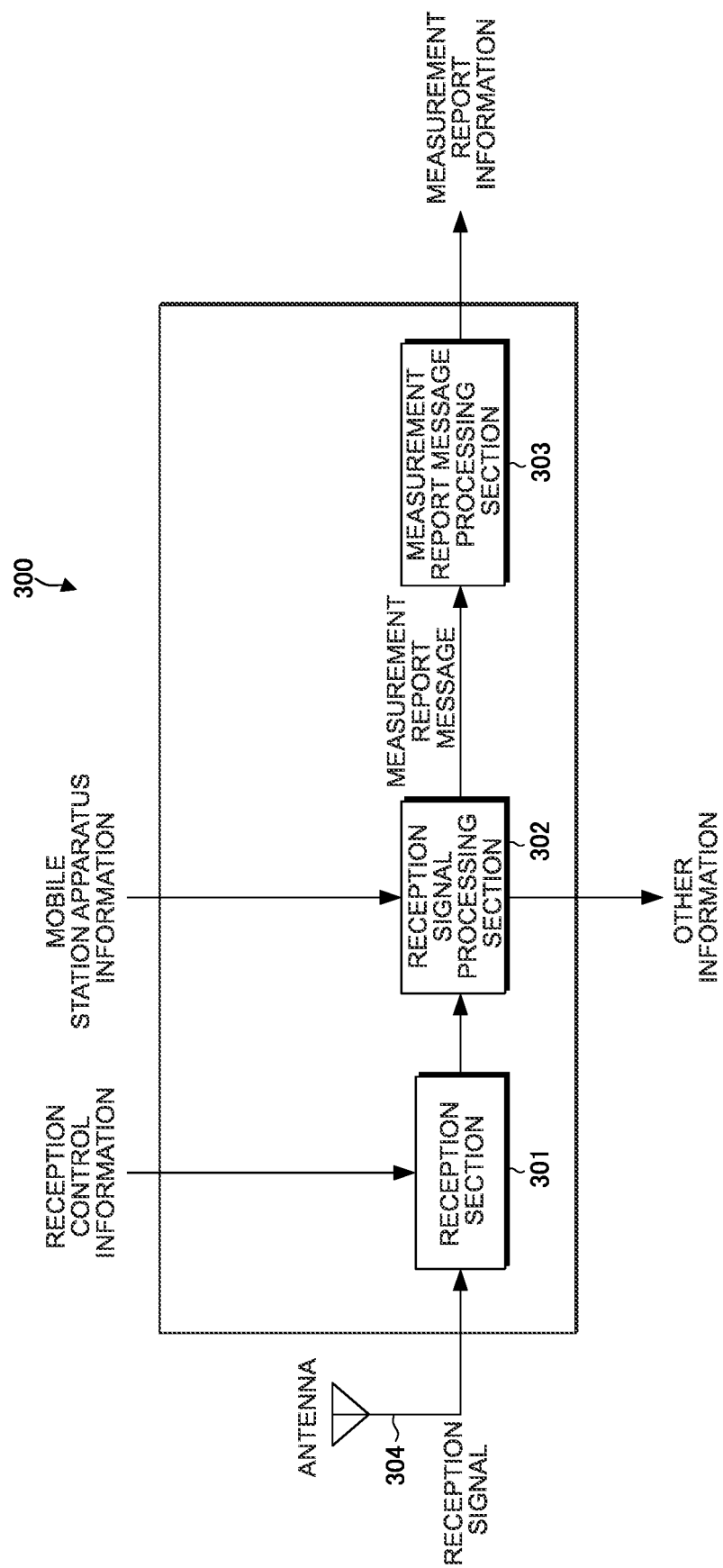
FIG. 3 is a block diagram showing an example of a reception device of a base station apparatus in the first embodiment in accordance with the invention.

FIG. 3 is a block diagram showing an example of a reception device of a base station apparatus in the first embodiment in accordance with the invention. A reception device 300 includes a reception section 301, a reception signal processing section 302, a measurement report message processing section 303, and an antenna 304. A reception signal (a transmission signal from the mobile station apparatus) is received by the reception section 301 via the antenna 304. In the reception section 301, the reception signal is demodulated, based on reception control information indicating the channel schedule. The reception control information includes reception timings related to the respective channels for the individual mobile station apparatuses, the multiplexing method, the resource allocation information, and information on demodulation. According to the reception control information, the reception section 301 demodulates/decodes the reception signal for the respective channels, and outputs the signal to the reception signal processing section 302. Further, to the reception signal processing section 302, mobile station apparatus information is input. The mobile station apparatus information includes mobile station apparatus access-class information.

The reception signal processing section 302 sorts input signals by mobile station apparatus, and further appropriately processes the input signals for the respective channels. When an input signal is a measurement report message, the measurement report message is output to the measurement report message processing section 303. Signals other than measurement report messages processed by the reception signal processing section 302, for example, traffic data of a user, uplink control data, other control messages, and the like, are input to individual processing blocks as other information, however, these pieces of information are not related to the invention, and description thereof will be omitted.

The measurement report message processing section 303 outputs cell information included in the measurement report message and measurement report information that includes quality information on the downlink reference signal.

Figure 4:
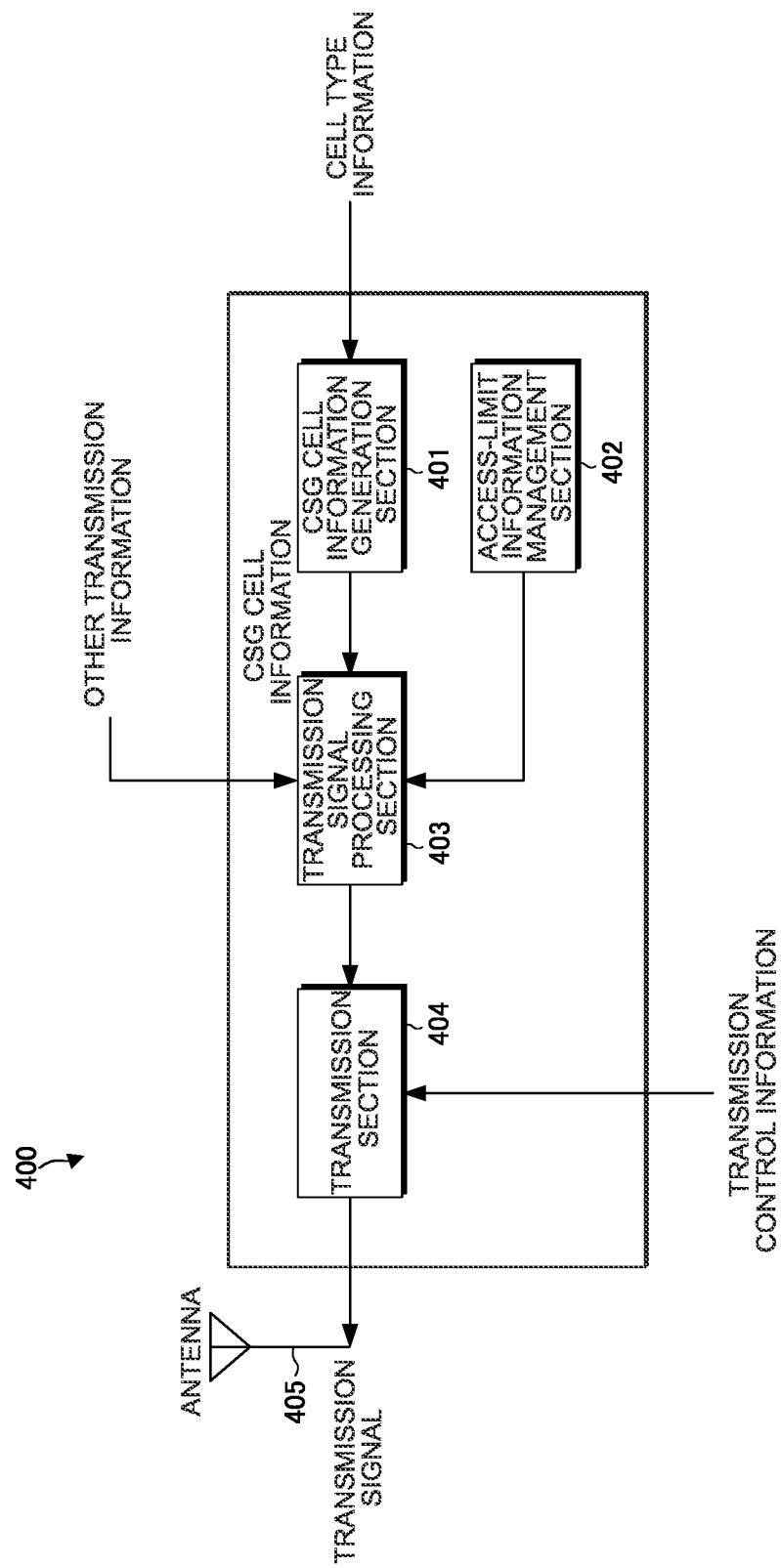
FIG. 4 is a block diagram showing an example of a transmission device of the base station apparatus in the first embodiment in accordance with the invention.

FIG. 4 is a block diagram showing an example of a transmission device of the base station apparatus in the first embodiment in accordance with the invention. The transmission device 400 includes a CSG cell information generation section 401, an access-restriction information management section 402, a transmission signal processing section 403, a transmission section 404, and an antenna 405. Cell type information is input to the CSG cell information generation section 401. Cell type information is information for determining whether the base station apparatus is a CSG cell or a normal cell. When the cell type information is for a CSG cell, the CSG cell information generation section 401 generates and outputs CSG cell information to the transmission signal processing section 403. When the cell type information is not for a CSG cell (a case of a normal cell), nothing is carried out.

Herein, any CSG cell information enabling the mobile station apparatus to determine the base station apparatus to be a CSG cell is applicable, and the content of the CSG cell information may be arbitrary. For example, the CSG cell information may be cell ID information for generation of a synchronization signal, CSG cell identifier information included in broadcast information, or information on the transmission frequency band.

In the access-restriction information management section 402, information on mobile station apparatuses access-restricted by the base station apparatus is registered in advance, and the information on the access-restricted mobile station apparatuses is set in broadcast information. In the transmission signal processing section 403, the CSG cell information and the information on the access-restricted mobile station apparatuses are input. The transmission signal processing section 403 performs appropriate scheduling for a transmission signal generated based on the CSG cell information from the CSG cell information generation section 401 and other transmission signals. Other transmission signals are downlink user traffic data, downlink control data, a downlink reference signal, and the like of the respective mobile station apparatuses.

Data that is output from the transmission signal processing section 403, based on the scheduling, is output by the transmission section 404 as a transmission signal via the antenna 405, according to transmission control information. The transmission control information includes transmission timings related to the respective channels, the multiplexing method, the resource allocation information, and information on modulation.

In FIGS. 3 and 4, since the other components of the base station apparatus are not related to the present embodiment, description thereof will be omitted.

Figure 5:
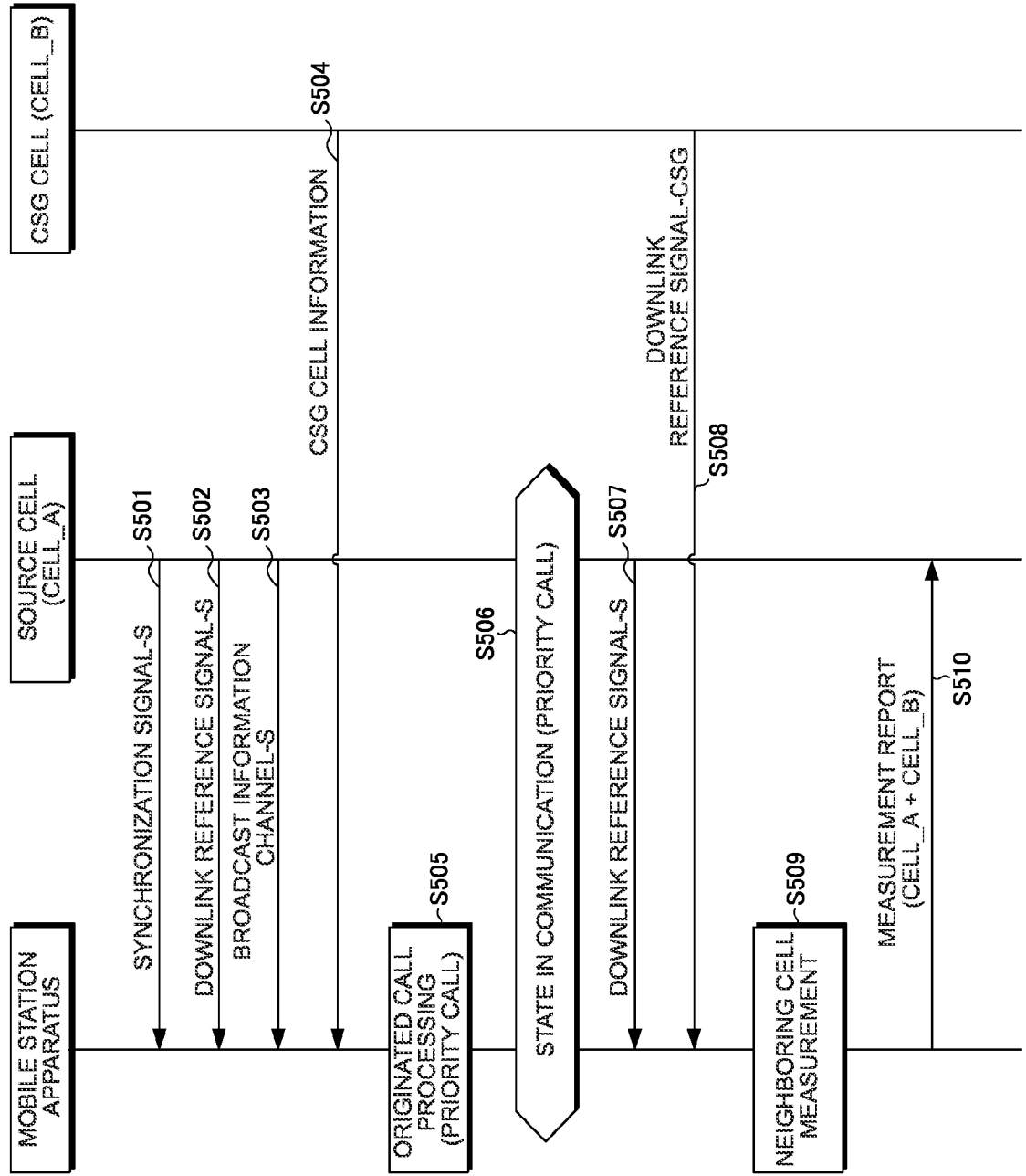
FIG. 5 is a sequence chart illustrating about the measurement of a neighboring cell and a measurement report in the first embodiment in accordance with the invention.

FIG. 5 is a sequence chart illustrating about a neighboring cell measurement procedure in a priority call communication state and a measurement report procedure. Herein, a mobile station apparatus belongs to a base station apparatus (a source cell). The mobile station apparatus receives a synchronization signal-s from the source cell (cell_A) (step S501), a downlink reference signal-s (step S502), and broadcast information-s (step S503), and further obtains CSG cell information from a CSG cell (cell_B) (step S504). In FIG. 5, it is illustrated for simplification such that CSG cell information is transmitted from the CSG cell (cell_B). However, a message of CSG cell information is not actually transmitted, and information is transmitted from the CSG cell so that a normal cell can be distinguished from a CSG cell by the mobile station apparatus with a physical or control parameter, wherein the format of the information and the physical channel to be used may be arbitrary. For example, it may be cell ID information notified by a synchronization signal, CSG cell identifier information included in broadcast information notified by a broadcast information channel, or information on the frequency band of a detected synchronization signal. Further, cells_A to B may be allocated to respective different frequencies or may be based on different communication methods.

After determining the cell_B to be a CSG cell from the CSG cell information, the mobile station apparatus may stop decoding/demodulating of the transmission signal (downlink physical channel) from the CSG cell (cell_B). That is, the downlink reference signal as the object of measurement by the mobile station apparatus at this moment is only the downlink reference signal-s from the source cell (cell_A).

Herein, the mobile station apparatus performs originated call processing (priority call) upon a request for originating a priority call (step S505). The mobile station apparatus, which has entered a state of communication (active state) with the source cell (cell_A), following a success in the originated call processing (priority call) (step S506), changes the control so as to make the downlink reference signals of all detected neighboring cells be objects of measurement. That is, at this moment, downlink reference signals as objects of measurement by the mobile station apparatus become the downlink reference signal-s from the source cell (cell_A) (step S507), and a downlink reference signal-csg from the CSG cell (cell_B) (step S508).

The mobile station apparatus performs measurement of neighboring cells, based on the downlink reference signals (step S509), and transmits an obtained measurement result, by including it in a measurement report message, to the source cell (cell_A) (step S510). In FIG. 5, the other channels transmitted from the CSG cell are omitted.

Figure 6:
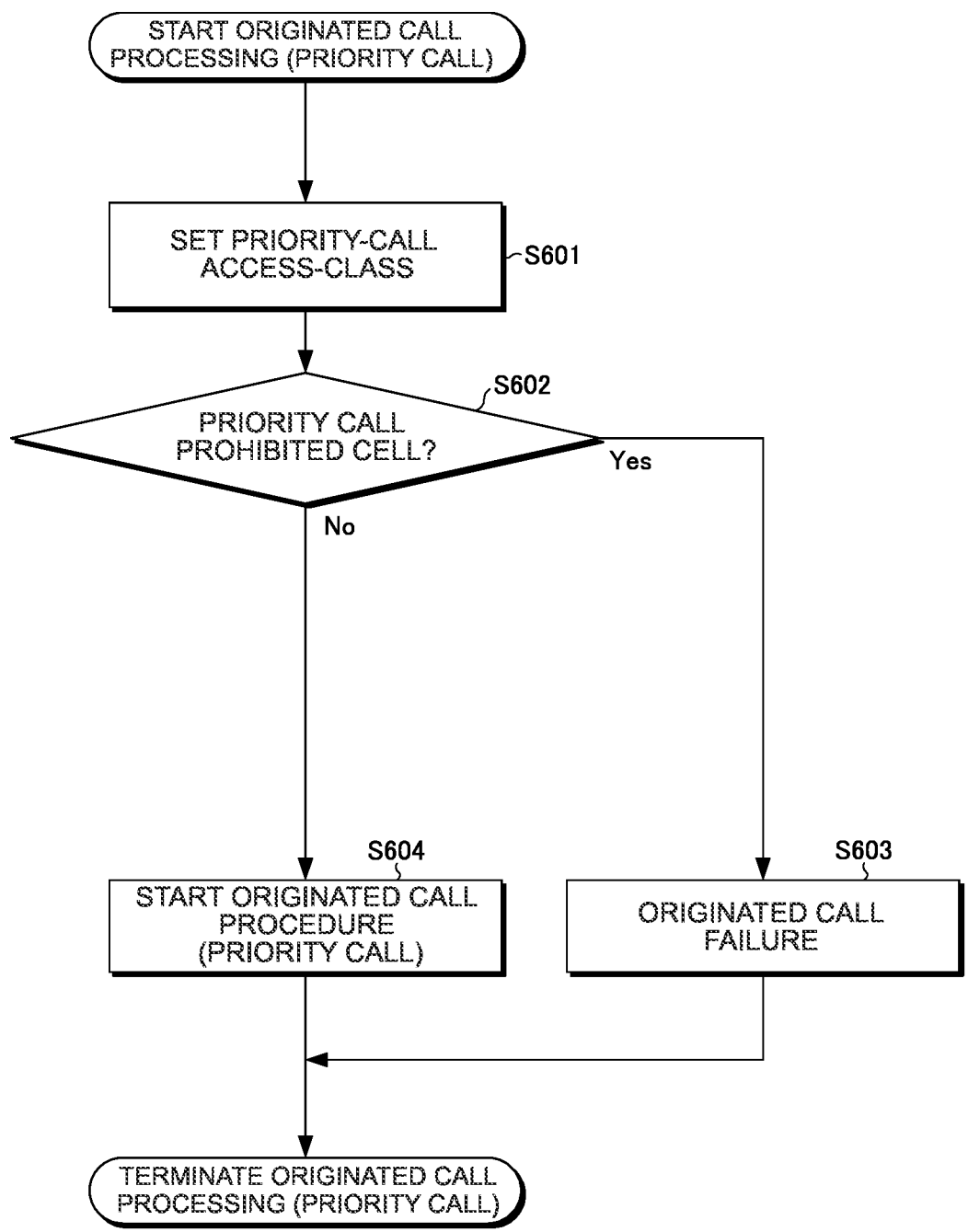
FIG. 6 is a flowchart showing a processing procedure of a originated call processing of a priority call in the mobile station apparatus in the first embodiment in accordance with the invention.
Figure 7:
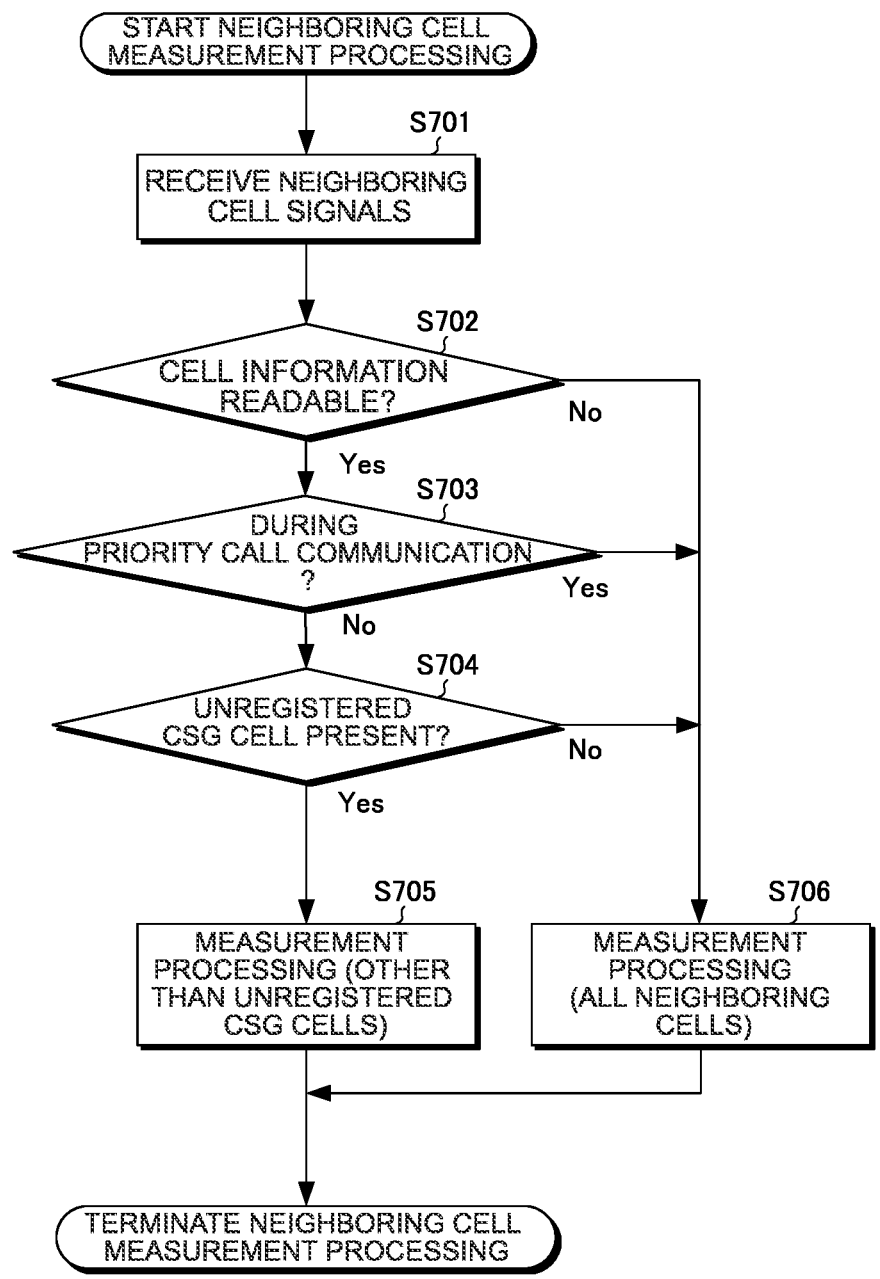
FIG. 7 is a flowchart showing a processing procedure of measurement processing of a neighboring cell in a priority call communication in the mobile station apparatus in the first embodiment in accordance with the invention.

Next, the originated call processing (priority call) of the mobile station apparatus and the details of the procedure of the measurement of neighboring cells in FIG. 5 are respectively shown in FIGS. 6 and 7. FIG. 6 is a flowchart showing an example of a processing procedure of originated call processing (a priority call) in the mobile station apparatus. In performing origination of a priority call, the mobile station apparatus performs access-class setting for a priority call defined in advance (step S601). Further, in the camped base station apparatus (source cell), confirmation as to whether or not the set access-class is prohibited is made based on the access-restriction information set in the broadcast information on the source cell.

It is determined whether or not a priority call is prohibited (step S602), and when a priority call is prohibited (a cell for testing, a cell under construction, etc.), it is determined that origination of a call has failed (step S603), and the process is terminated. On the other hand, in step S602, when a priority call is not prohibited, the process is continued to start the originated call procedure (priority call) (step S604). In the originated call procedure (priority call), the mobile station apparatus transmits the information on the set access-class, by including it in a radio signaling message (for example, a layer-3 message), to the base station apparatus.

FIG. 7 is a flowchart showing an example of a processing procedure of measurement of neighboring cells in the mobile station apparatus in accordance with the invention. The mobile station apparatus receives signals from neighboring cells (including the source cell) in receiving neighboring cell signals (step S701). Then, it is determined whether or not cell information can be read out (step S702). If cell information has been read out, then the call type is determined (step S703). In a case of a normal call communication, it is determined whether or not a CSG cell is disposed as a neighboring cell and further a signal of an unregistered CSG cell is included in the received signals, based on the CSG cell information (step S704).

In step S704, when an unregistered CSG cell is disposed as a neighboring cell, the measurement processing is performed based on downlink reference signals of neighboring cells, other than the unregistered CSG cell distinguished by the CSG information, out of detected cells (step S705).

On the other hand, in step S702, when cell information cannot be read out, for example, when a SIM card is not inserted in the mobile station apparatus, it cannot be determined whether or not a cell is a registered CSG cell, and communication permitted then for the mobile station apparatus is only for a priority call, measurement processing based on the downlink reference signals of all detected cells is performed (step S706). Likewise, in a case in a priority call communication in step S703, or in a case where an unregistered CSG cell is not disposed as a neighboring cell in step S704, measurement processing based on the downlink reference signals of all the detected cells is performed, regardless of CSG cell information (step S706). The flowchart shown in FIG. 7 is an example of a processing procedure of a mobile station apparatus, and any other processing procedure other than this may be used, if a method is applied in which a mobile station apparatus performs determination for switching measurement processing, depending on CSG cell information and call type, and, based on the determination, decides whether or not to include a CSG cell in cells as objects of measurement.

Further, based on the moving speed of the mobile station apparatus, it is also possible to determine whether or not to include unregistered CSG cells in measurement objects. For example, it is also possible to add, just before step S706, a step in which it is determined whether the mobile station apparatus is either stopping or moving at a low speed, and if the mobile station apparatus is either stopping or moving at a low speed, measurement processing is performed based on the downlink reference signals of all neighboring cells including unregistered neighboring cells. Further, it is also possible to add a step in which, if the mobile station apparatus is moving at a high speed conversely, measurement processing of CSG cells is not performed even when the CSG cells have been registered. Still further, when a list (also called a black list) of neighboring cells which are inappropriate as a handover destination is notified from the base station apparatus, measurement processing on the inappropriate cells may be stopped.

As has been described above, in the first embodiment, in a normal call communication state, a mobile station apparatus does not perform reception processing nor measurement processing of unregistered CSG cells, which are disposed in the periphery, and transmits a measurement report message without including measurement report information on unregistered CSG cells in the measurement report message. Further, in a priority call communication state, reception processing and measurement processing of downlink signals of CSG cells are performed even when the CSG cells are unregistered, and a measurement report message is transmitted by including measurement report information on the unregistered CSG cells in the measurement report message. Still further, the base station apparatus receives the measurement report message transmitted from the mobile station apparatus, and decides the mobility control of the mobile station apparatus, such as handover, based on the measurement report information.

According to the first embodiment, the mobile station apparatus can perform appropriate neighboring cell measurement processing, based on the state of the mobile station apparatus, and in a case of not a priority call, unnecessary measurement report information is not transmitted to the base station apparatus. Thus, the measurement efficiency of the mobile station apparatus is improved and the power consumption is reduced. Further, in a case of a priority call, it is possible to include unregistered CSG cells in a measurement report as a handover destination, and thereby the number of times of communication disconnect can be decreased. Yet further, as the mobile station apparatus does not report about unregistered CSG cells by a measurement report message, the base station apparatus does not need to determine each time whether a cell is one that permits handover, and thereby calculation processing is simplified. Further, as it is not necessary to allocate radio resources for an unnecessary measurement report, the usage efficiency of the radio resources is improved.

Second Embodiment

Next, a second embodiment in accordance with the invention will be described below. In the second embodiment, a measurement method to be applied in a case where a priority call communication has terminated (normal termination, reconnection) and a method of deciding the best neighboring cell, based on the measurement method, will be provided.

Figure 8:
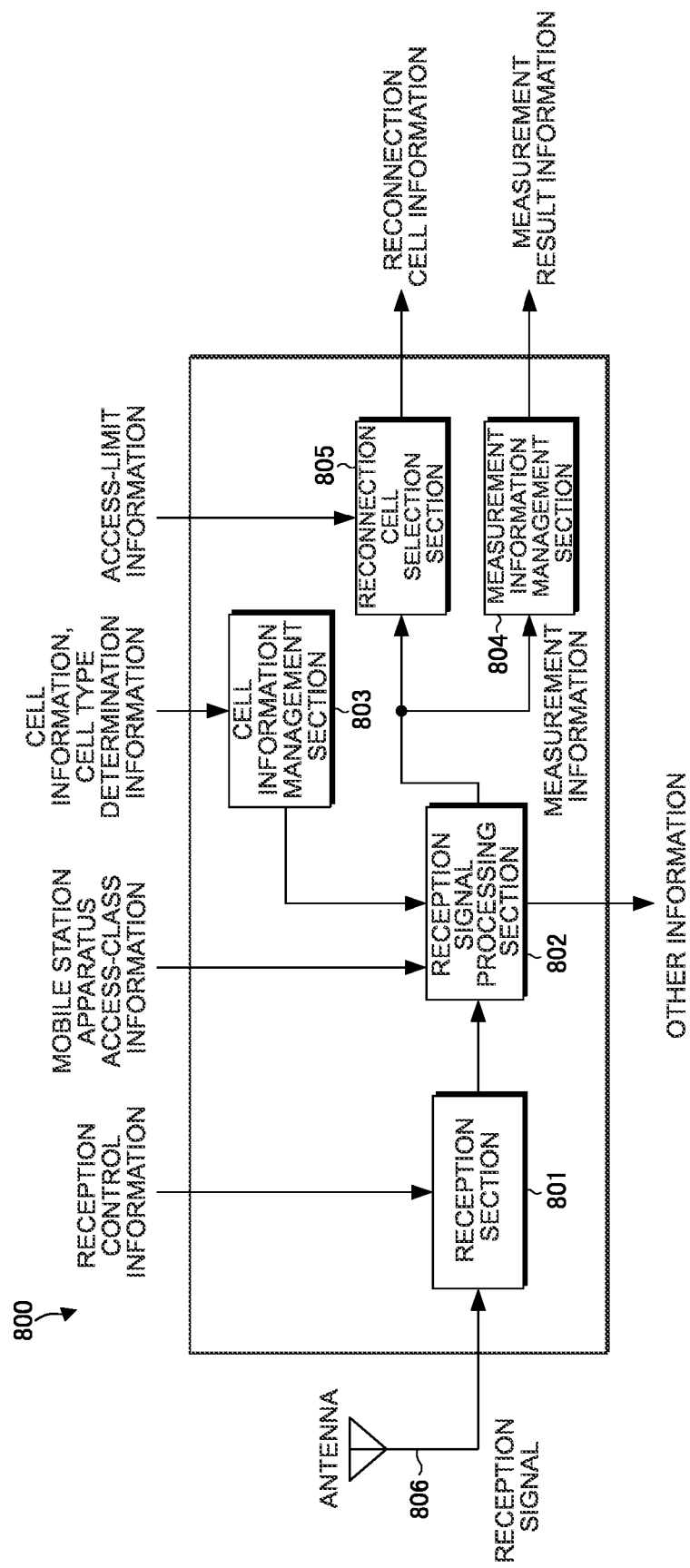
FIG. 8 is a block diagram showing an example of a reception device of a mobile station apparatus in a second embodiment in accordance with the invention.

FIG. 8 is a block diagram showing an example of a reception device of a mobile station apparatus in a second embodiment in accordance with the invention. A reception device 800 includes a reception section 801, a reception signal processing section 802, a cell information management section 803, a measurement information management section 804, a reconnection cell selection section 805, and an antenna 806. The difference from FIG. 1 is that access-restriction information obtained from broadcast information is input to the reconnection cell selection section 805, and measurement information being output from the reception signal processing section 802 is input to both the measurement information management section 804 and the reconnection cell selection section 805. Other blocks are the same as those in FIG. 1, and therefore description thereof will be omitted.

The access-restriction information that is input to the reconnection cell selection section 805 is information that is included in the broadcast information from a base station apparatus and is used to prohibit mobile station apparatuses other than those of a certain access-class from camping or performing communication, or, to conversely permit the mobile station apparatuses of the certain access-class to perform camping or communication, wherein the access-restriction information includes information on the restricted access class and a restricted time.

Based on mobile station apparatus access-class information, cell information, and cell type determination information, the reception signal processing section 802 outputs measurement information necessary for selection of a reconnection cell to the reconnection cell selection section 805. The reconnection cell selection section 805 selects the best reconnection cell, based on access-restriction information on the cells indicated by the measurement information, and outputs reconnection cell information.

Figure 9:
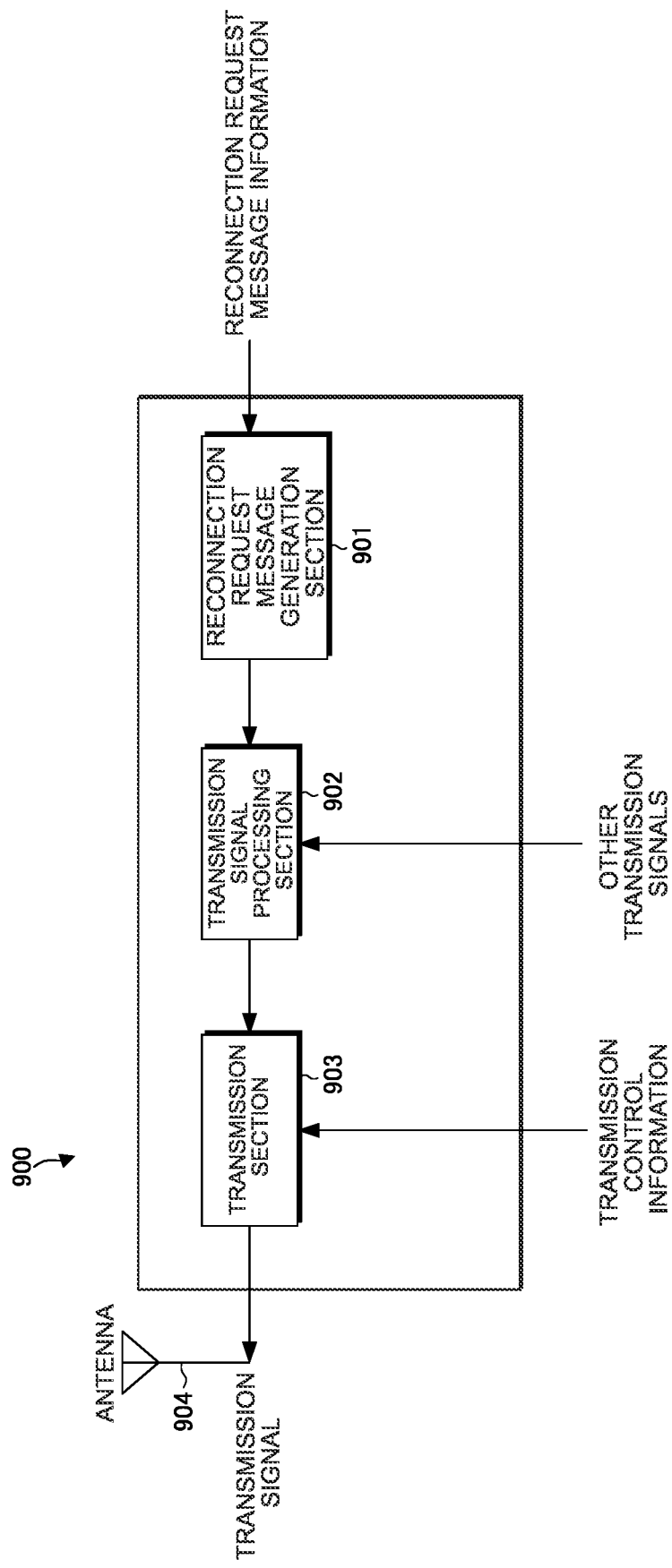
FIG. 9 is a block diagram showing an example of a transmission device of the mobile station apparatus in the second embodiment in accordance with the invention.

FIG. 9 is a block diagram showing an example of a transmission device of a mobile station apparatus in the second embodiment in accordance with the invention. The transmission device 900 includes a reconnection request message generation section 901, a transmission signal processing section 902, a transmission section 903, and an antenna 904. To the reconnection request message generation section 901, reconnection request message information (cell ID before reconnection, mobile station apparatus access-class information, etc.) is input, according to an instruction by an upper layer and at an appropriate timing. The reconnection request message generation section 901 generates a reconnection request message, based on the reconnection request message information, and outputs the message to the transmission signal processing section 902.

The transmission signal processing section 902 performs appropriate scheduling for the reconnection request message from the reconnection request message generation section 901 and other transmission signals. Other transmission signals are uplink user traffic data, uplink control data, an uplink reference signal, and the like. Data that is output from the transmission signal processing section 902, based on the scheduling, is output by the transmission section 903 as a transmission signal, according to transmission control information and via the antenna 904. The transmission control information includes transmission timings related to the respective channels, a multiplexing method, resource allocation information, and information on modulation.

In FIGS. 8 and 9, as the other components of the mobile station apparatus are not related to the present embodiment, description thereof will be omitted.

Figure 10:
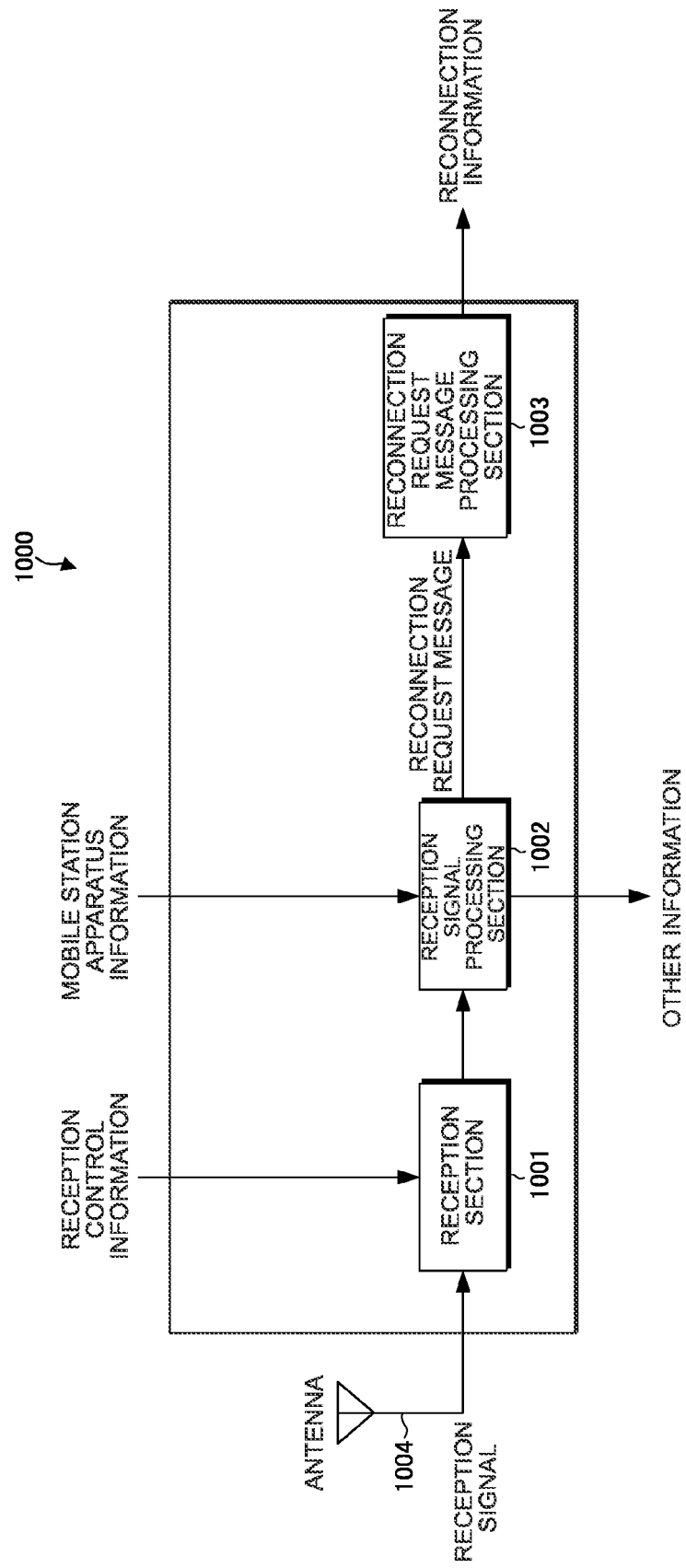
FIG. 10 is a block diagram showing an example of a reception device of a base station apparatus in the second embodiment in accordance with the invention.

FIG. 10 is a block diagram showing an example of a reception device of a base station apparatus in the second embodiment in accordance with the invention. The reception device 1000 includes a reception section 1001, a reception signal processing section 1002, a reconnection request message processing section 1003, and an antenna 1004. A reception signal (a transmission signal from a mobile station apparatus) is received by the reception section 1001 via the antenna 1004. The reception signal is demodulated by the reception section 1001, based on reception control information indicating a channel schedule. The reception control information includes reception timings related to the respective channels of each mobile station apparatus, a multiplexing method, resource allocation information, and information related to demodulation. According to the reception control information, the reception section 1001 demodulates/decodes the reception signal for the respective channels, and outputs the signal to the reception signal processing section 1002. Further, mobile station apparatus information is input to the reception signal processing section 1002. The mobile station apparatus information includes mobile station apparatus access-class information.

The reception signal processing section 1002 sorts input signals by mobile station apparatus, and further appropriately processes the input signals for the respective channels. When an input signal is a reconnection request message, the reconnection request message is output to the reconnection request message processing section 1003. Signals other than reconnection request messages processed by the reception signal processing section 1002, for example, traffic data of a user, uplink control data, other control messages, and the like, are input to individual processing blocks as other information, however, these pieces of information are not related to the invention, and description thereof will be omitted. The reconnection request message processing section 1003 outputs reconnection request information (cell ID before reconnection, mobile station apparatus access-class information, etc.) from the reconnection request message.

In FIG. 10, as other components of the base station apparatus are not related to the invention, description thereof will be omitted. Further, the transmission device of the base station apparatus can employ the same configuration as that in FIG. 4 in the first embodiment.

Figure 11:
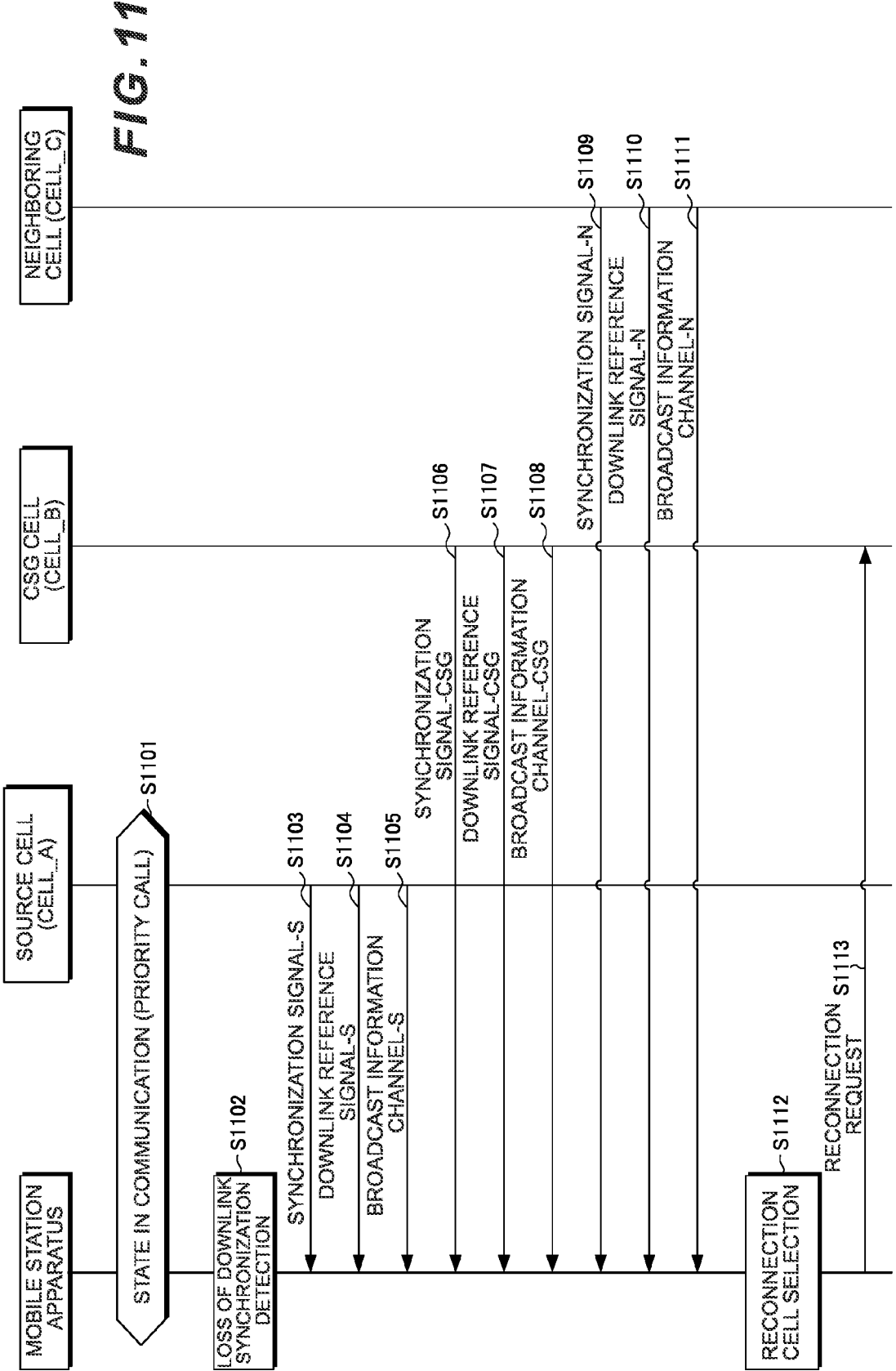
FIG. 11 is a sequence chart illustrating about selection of a reconnection cell and a request for reconnection in the second embodiment in accordance with the invention.

In addition to the cases of normal termination of communication, termination of a priority call communication may occur when communication terminates along with being out of a downlink synchronization due to deterioration in the radio quality. Herein, in order to reestablish radio connection, the mobile station apparatus starts a reconnection procedure including selection of a reconnection cell and a reconnection request. FIG. 11 is a sequence chart illustrating a processing procedure of selection of a reconnection cell and a procedure of requesting reconnection, in a case where a state being out of synchronization has occurred in a state of a priority call communication. Herein, it is assumed that the mobile station apparatus belongs to the base station apparatus (source cell_A) and is in a state of a priority call communication (step S1101).

In FIG. 11, suppose that a state being out of synchronization has occurred due to deterioration in the radio environment (step S1102). At this moment, the mobile station apparatus receives signals from all the neighboring cells (including a source cell), and tries reconnection to a cell with the best reception quality. That is, as shown in FIG. 11, when a source cell (cell_A), a CSG cell (cell_B), and a neighboring cell (cell_C) are present, the mobile station apparatus receives a synchronization signal-s (step S1103), a downlink reference signal-s (step S1104), and broadcast information-s (step S1105) from the source cell (cell_A). The mobile station apparatus receives a synchronization signal-csg (step S1106), a downlink reference signal-csg (step S1107), and broadcast information-csg (step S1108) from the CSG cell (cell_B).

Further, the mobile station apparatus receives a synchronization signal-n (step S1109), a downlink reference signal-n (step S1110), and broadcast information-n (step S1111) from the neighboring cell (cell_C). Herein, even when the mobile station apparatus has obtained CSG cell information, if the call type before the state being out of synchronization is a priority call, the mobile station apparatus receives the signals from the CSG cell, and performs measurement processing on the downlink reference signal-csg. Then, based on the reconnection cell selection processing, the mobile station apparatus selects a cell with the best quality of the downlink measurement (step S1112), and transmits a reconnection request message to the selected cell (step S1113).

FIG. 11 shows an example of a case where the CSG cell (cell_B) is assumed to be the best cell. Although, actually, a random access procedure is necessary prior to the reconnection request message, it is omitted in FIG. 11 for simplification. The cells_A to C may be allocated to respective different frequencies, and may be based on respective different communication methods.

Figure 12:
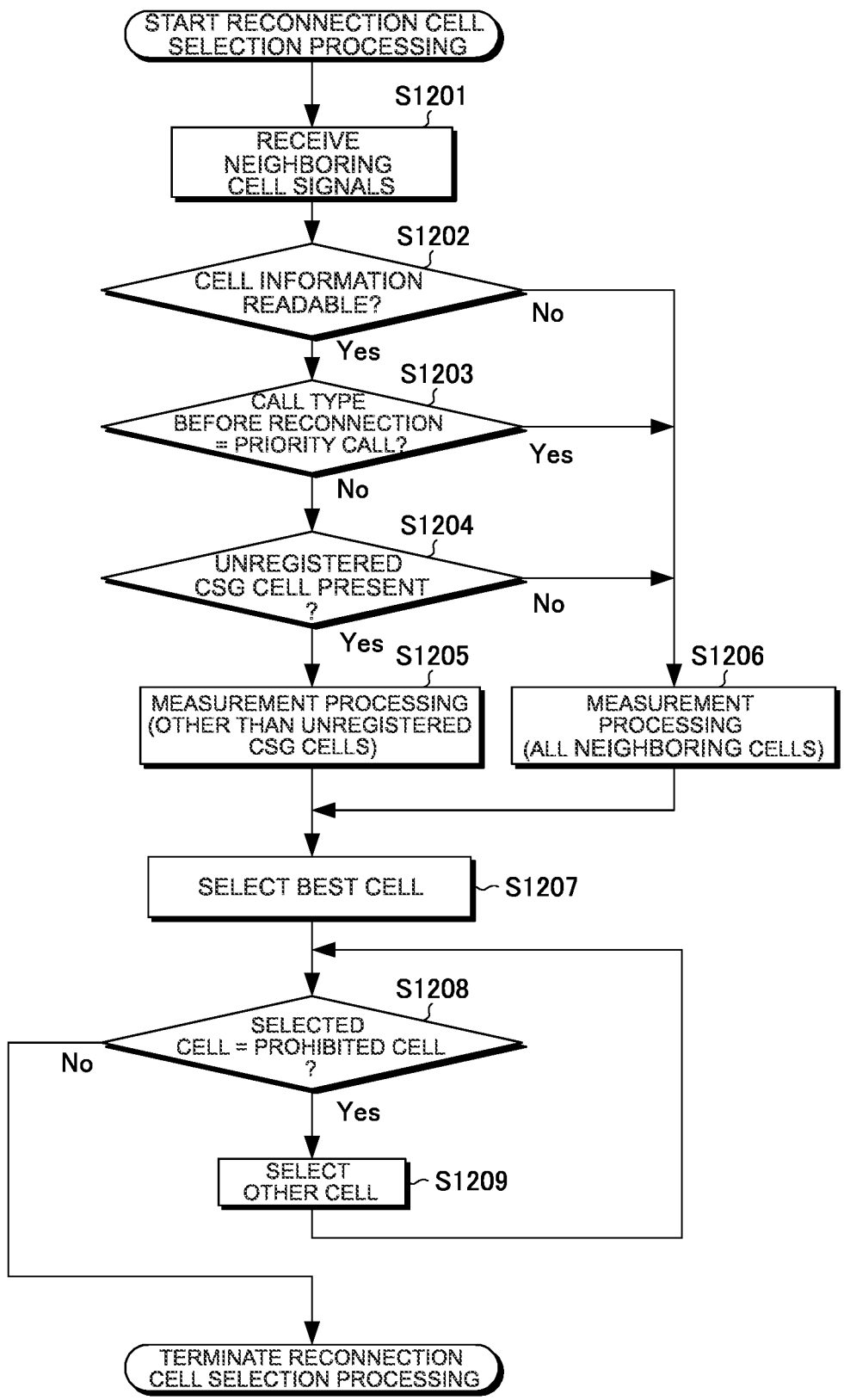
FIG. 12 is a flowchart showing a processing procedure of reconnection cell selection processing in the mobile station apparatus in the second embodiment in accordance with the invention.

FIG. 12 is a flowchart showing an example when the mobile station apparatus performs a processing procedure of selecting a reconnection cell in FIG. 11. When the mobile station apparatus detects an occurrence of the state being out of a downlink synchronization in a priority call communication with an arbitrary base station apparatus (a source cell), the mobile station apparatus first selects the best cell at the time of the occurrence of the state being out of downlink synchronization, and receives a signal from a neighboring cell (including the source cell) for performing reconnection (step S1201). Next, it is determined whether or not cell information can be read out (step S1202). If cell information is read out, then the call type is determined, based on the last priority of a call in communication before reconnection (step S1203). If the last call type is a normal call, it is determined whether or not a CSG cell is disposed as a neighboring cell and a signal of an unregistered CSG cell is included in reception signals, based on the CSG cell information (step S1204).

In step S1204, if an unregistered CSG cell is disposed as a neighboring cell, measurement processing is performed, based on the downlink reference signals of neighboring cells, out of detected cells, other than the unregistered CSG cell distinguished by CDS information (step S1205).

On the other hand, in step S1202, if cell information cannot be read out, for example, in a case where a SIM card is not inserted in the mobile station apparatus, it cannot be determined whether or not a cell is a registered CSG cell, and further, communication permitted for the mobile station apparatus is only by a priority call. Therefore, measurement processing is performed, based on the downlink reference signals of all the detected cells (step S1206). Likewise, in step S1203, if the call type just before is a priority call, or, in step S1204, if no unregistered CSG cell is disposed as a neighboring cell, measurement processing is performed, based on the reference signals of all the detected cells, regardless of the CSG cell information (step S1206). Next, based on a result by one of the above-described measurement processings, the best one cell is selected (step S1207). Next, access-restriction information on the selected best cell and access-class information of the mobile station apparatus are compared (step S1208). If communication by this access-class is prohibited, then the next best cell is reselected as the best cell (step S1209), and confirmation processing as to whether the cell is a prohibited cell is repeated. On the other hand, in step S1208, if communication at this access-class is not prohibited with regard to the best cell, the selected cell is established as the reconnection cell, and the processing is terminated.

The flowchart shown in FIG. 12 is an example of a processing procedure of the mobile station apparatus, and it is possible to use any other processing procedure by a method in which the mobile station apparatus makes determination for switching the measurement processing depending on the CSG cell information and the call type, decides whether or not cells as objects of measurement include CSG cells, based on the determination, and can determine whether or not it is prohibited to access a cell which has been determined to be the best cell as a result of the measurement. Further, based on the moving speed of the mobile station apparatus, it is also possible to determine whether or not to include unregistered CSG cells in objects of measurement. For example, it is also possible to add a step, just before step S1206, that determines whether the mobile station apparatus is stopping or moving at a low speed, and if the mobile station apparatus is stopping or moving at a low speed, then performs measurement processing based on the downlink reference signals of all neighboring cells including unregistered CSG cells. It is also possible to add a step that, when the mobile station apparatus is moving at a high speed conversely, does not perform measurement processing of CSG cells even if the CSG cells have been registered. Further, when a list (also called a black list) of neighboring cells that are inappropriate for reconnection has been notified, the measurement processing on the inappropriate cells may be stopped. Still further, in a case of performing a handover procedure by a network instruction or a control procedure for switching to a circuit switching network, in a priority call communication, it is possible to apply a procedure similar to the procedure in FIG. 12.

Figure 13:
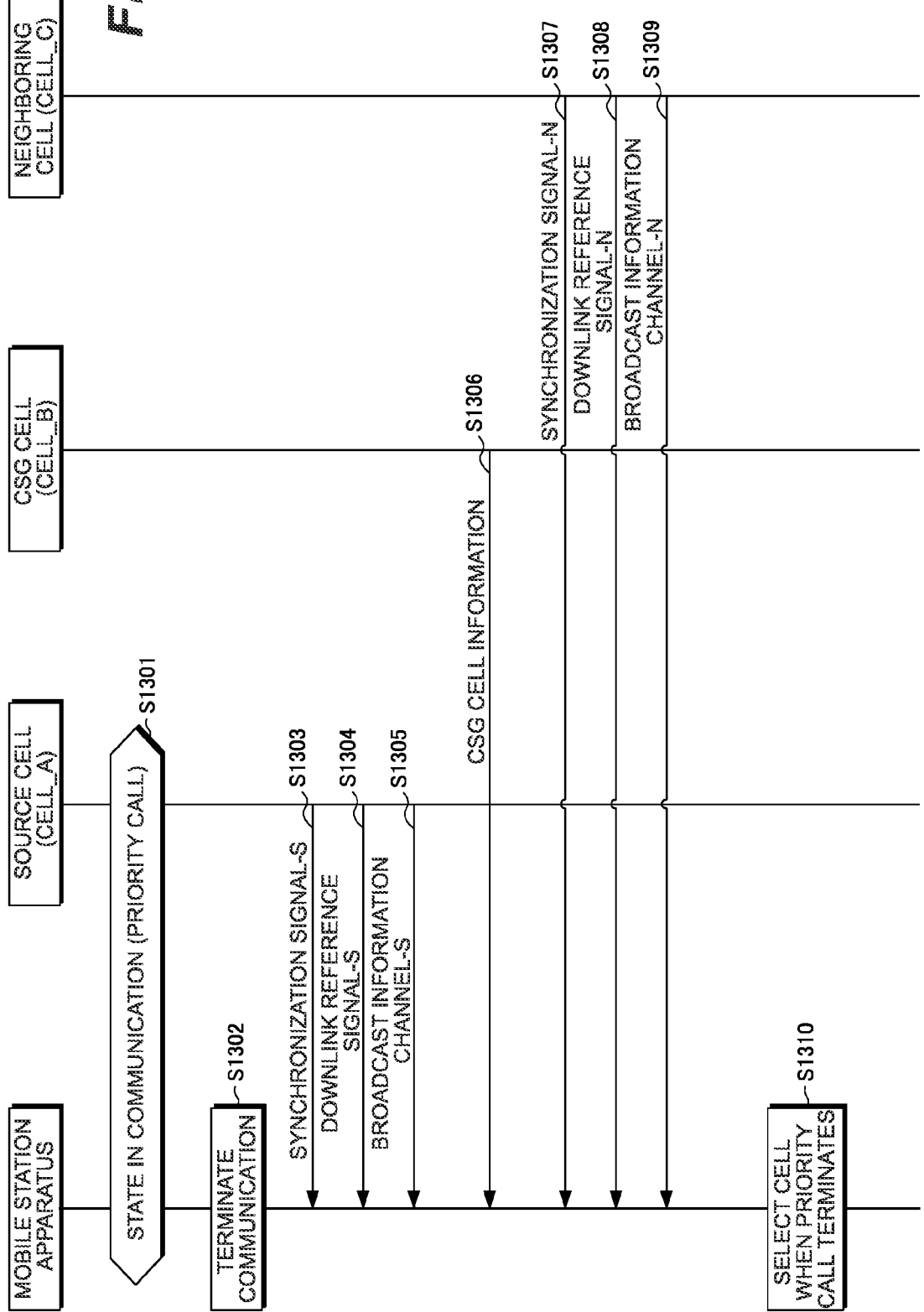
FIG. 13 is a sequence chart showing cell selection at the time of termination of a priority call in the second embodiment in accordance with the invention.

FIG. 13 is a sequence chart showing a cell selection procedure to be performed at the time of a cell priority call termination after a normal termination of a priority call communication, wherein it is assumed that the mobile station apparatus belongs to the base station apparatus (source cell (cell_A)) and is in a state of a priority call communication (step S1301). Herein, it is assumed that the priority call communication is terminated by a request for releasing the radio connection by a layer-3 signaling message (step S1302). At this time, while distinguishing CSG cells from normal cells other than the CSG cells, the mobile station apparatus performs measurement of the downlink reference signals of cells other than the CSG cells. That is, as shown in FIG. 13, when a source cell (cell_A), a CSG cell (cell_B), and a neighboring cell (cell_C) are present, the mobile station apparatus receives, from the source cell (cell_A), a synchronization signal-s (step S1303), a downlink reference signal-s (step S1304), and broadcast information-s (step S1305). Further, the mobile station apparatus receives, from the neighboring cell (cell_C), a synchronization signal-n (step S1307), a downlink reference signal-n (step S1308), and broadcast information-n (step S1309). Still further, after receiving CSG cell information from the CSG cell (cell_B) (step S1306) and determining that cell_B is a CSG cell, the mobile station apparatus may stop the processing of receiving a transmission signal (downlink physical channel) from the CSG cell (cell_B).

FIG. 13 illustrates for simplification such that CSG cell information is transmitted from the CSG cell (cell_B). However, actually, a message of CSG cell information is not transmitted, but information is transmitted from the CSG cell so as to enable the mobile station apparatus to distinguish a normal cell from a CSG cell physically or by a control parameter, and the format thereof and the physical channel to be used may be arbitrary. For example, the information may be cell ID information notified by a synchronization signal, CSG cell identifier information included in broadcast information notified by a broadcast information channel, or information on the frequency band of a detected synchronization signal. In FIG. 13, other channels transmitted from the CSG cell are omitted.

Based on the cell selection processing to be performed at the time of a priority call termination, the mobile station apparatus selects a cell of the best downlink measurement quality other than CSG cells (step S1310), and tries camping of the selected cell. Further, cells_A to C may be allocated to respective different frequencies, and may be based on different communication methods.

Figure 14:
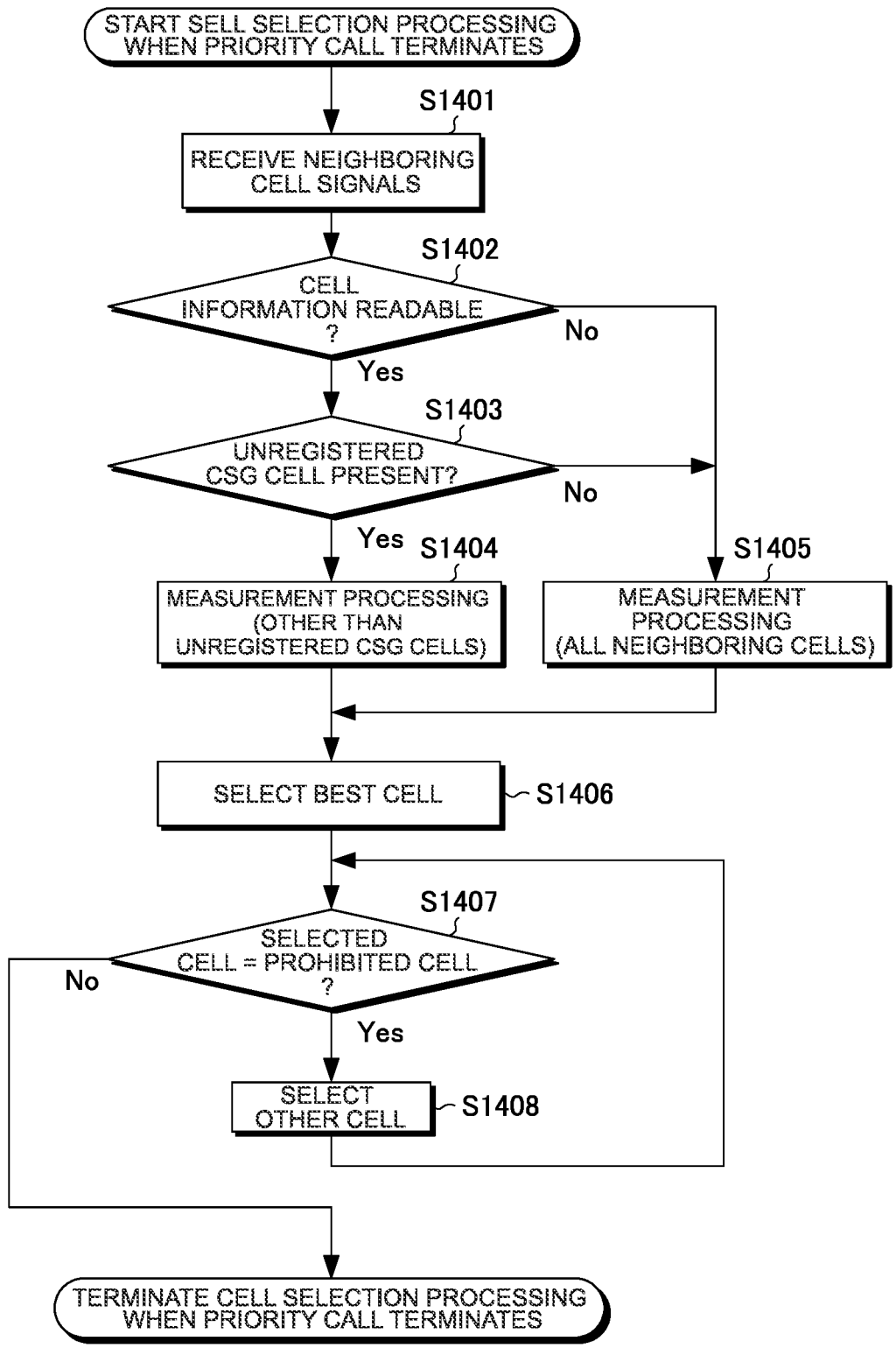
FIG. 14 is a flowchart showing a processing procedure of a cell selection processing at the time of termination of the priority call in the mobile station apparatus in the second embodiment in accordance with the invention.

FIG. 14 is a flowchart showing an example of a procedure of cell selection processing at the time of priority call termination in the invention to be performed when the mobile station apparatus normally terminates a priority call communication. In receiving signals from neighboring cells after the termination of priority call communication, the mobile station apparatus receives signals from the neighboring cells (including the source cell) (step S1401). Next, it is determined whether or not cell information can be read out (step S1402). If cell information has been read out, then it is determined whether or not CSG cells are disposed as neighboring cells and also whether or not a signal of an unregistered cell is included in reception signals, based on the CSG cell information (step S1403). In step S1403, if an unregistered CSG cell is disposed as a neighboring cell, then measurement processing is performed, based on downlink reference signals of neighboring cells, out of the detected cells, other than the unregistered CSG cell distinguished by the CSG information (step S1404).

On the other hand, if cell information cannot be read out in step S1402, for example, in a case where a SIM card is not inserted in the mobile station apparatus, as it is not possible to determine whether or not a CSG cell is a registered CSG cell, measurement processing is performed, based on the downlink reference signals of all the detected cells (step S1405). Likewise, if no unregistered CSG cells are disposed as neighboring cells in step S1403, measurement processing is performed, based on the downlink reference signals of all the detected cells, regardless of the CSG cell information (step S1405).

The mobile station apparatus selects a cell with the highest measurement quality as the best cell, based on a measurement result obtained by the measurement processing in step S1404 or step S1405 (step S1406). Next, the access-restriction information on the best cell having been selected and the access-class information on the mobile station apparatus are compared (step S1407), and if communication at this access class is prohibited, the mobile station apparatus selects again the next-best cell as the best cell (step S1408), and repeats determination as to whether or not the cell is a prohibited cell. On the other hand, if communication at this access class is not prohibited for the best cell, the mobile station apparatus establishes the selected cell as a cell for camping target and terminates the processing.

The flowchart in FIG. 14 is an example of a processing procedure of the mobile station apparatus, and a processing procedure other than this may be used, based on a method in which the mobile station apparatus, after termination of the priority call communication and according to the CSG cell information, can determine whether or not cells as measurement objects are CSG cells, and further can determine, as a result of the measurement, whether or not the cell having been determined to be the best cell is prohibited for access. Further, it is also possible to determine whether or not to include unregistered CSG cells in measurement objects, based on the moving speed of the mobile station apparatus. For example, it is also possible to add a step, just before step S1405, that determines whether or not the mobile station apparatus is stopping or moving at a low speed, and if the mobile station apparatus is stopping or moving at a low speed, performs measurement processing, based on the downlink reference signals of all the neighboring cells including unregistered CSG cells. Further, it is also possible to add a step that, if the mobile station apparatus is moving at a high speed conversely, does not perform measurement processing of any CSG cell even if the CSG cell has been registered.

As has been described above, in the second embodiment, at the time of reconnection, the mobile station apparatus can select a cell as a reconnection target even when the cell is unregistered, and transmit a reconnection message to the unregistered CSG cell. Further, the base station apparatus receives the reconnection request message of the mobile station apparatus, and can permit the CSG cell as a reconnection destination.

Further, in the second embodiment, in addition to the advantages in the first embodiment, it is possible for the mobile station apparatus to select an unregistered CSG cell as a reconnection cell at the time of reconnection procedure, thus increase the success probability of reconnection, and improve the communication quality.

Third Embodiment

A third embodiment in accordance with the invention will be described below. In the third embodiment, provided is a method in which a base station apparatus provides a mobile station apparatus in a priority call communication, with information on a peripheral base station apparatus, and thereby a more effective measurement can be attained. In the third embodiment, the reception device and the transmission device of the mobile station apparatus, and the reception device of the base station apparatus, can have the same configurations as those in the first embodiment.

Figure 15:
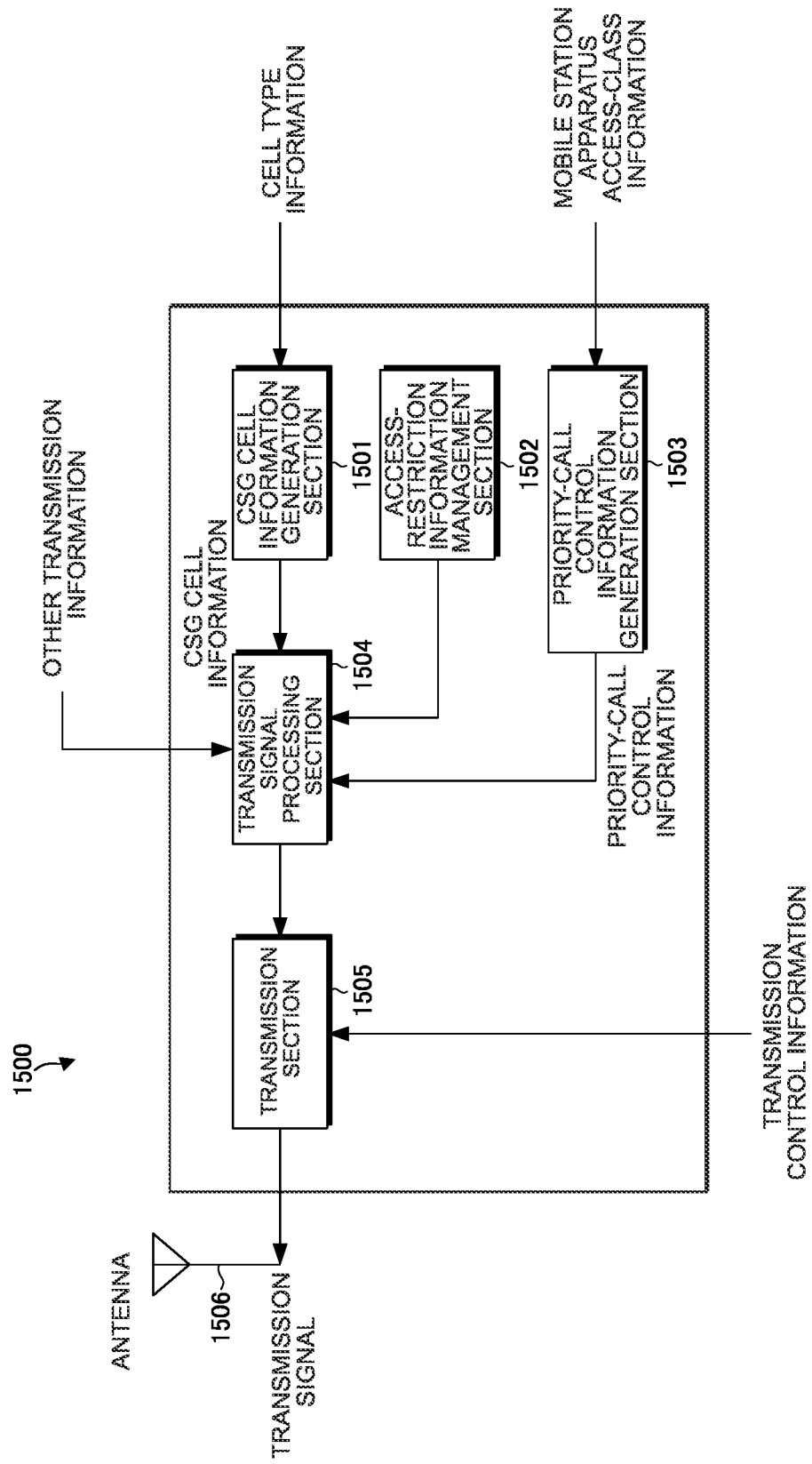
FIG. 15 is a block diagram showing an example of a transmission device of a base station apparatus in a third embodiment in accordance with the invention.

FIG. 15 is a block diagram showing an example of a transmission device of the base station apparatus in the third embodiment in accordance with the invention. A transmission device 1500 includes a CSG cell information generation section 1501, an access-restriction information management section 1502, a priority-call control information generation section 1503, a transmission signal processing section 1504, a transmission section 1505, and an antenna 1506. FIG. 15 is the same as FIG. 4 except that priority-call control information is input from the priority-call control information generation section 1503 to the transmission signal processing section 1504, and accordingly description will be omitted.

Access-class information of the mobile station apparatus notified from the mobile station apparatus is input to the priority-call control information generation section 1503. If the access-class information of the mobile station apparatus includes information indicating a priority call as a call type, priority-call control information, which has been registered in advance in the priority-call control information generation section 1503, is input to the transmission signal processing section 1504. The priority-call control information at least includes information on peripheral base station apparatuses selectable as a handover destination cell (also called a white list, and including cell IDs and frequency band information). The transmission signal processing section 1504 performs appropriate scheduling for the transmission signal which is generated based on the CSG cell information from the CSG cell information generation section 1501, the priority-call control information, and other transmission signals. In FIG. 15, other components of the base station apparatus are not related to the invention, and are accordingly omitted.

Figure 16:
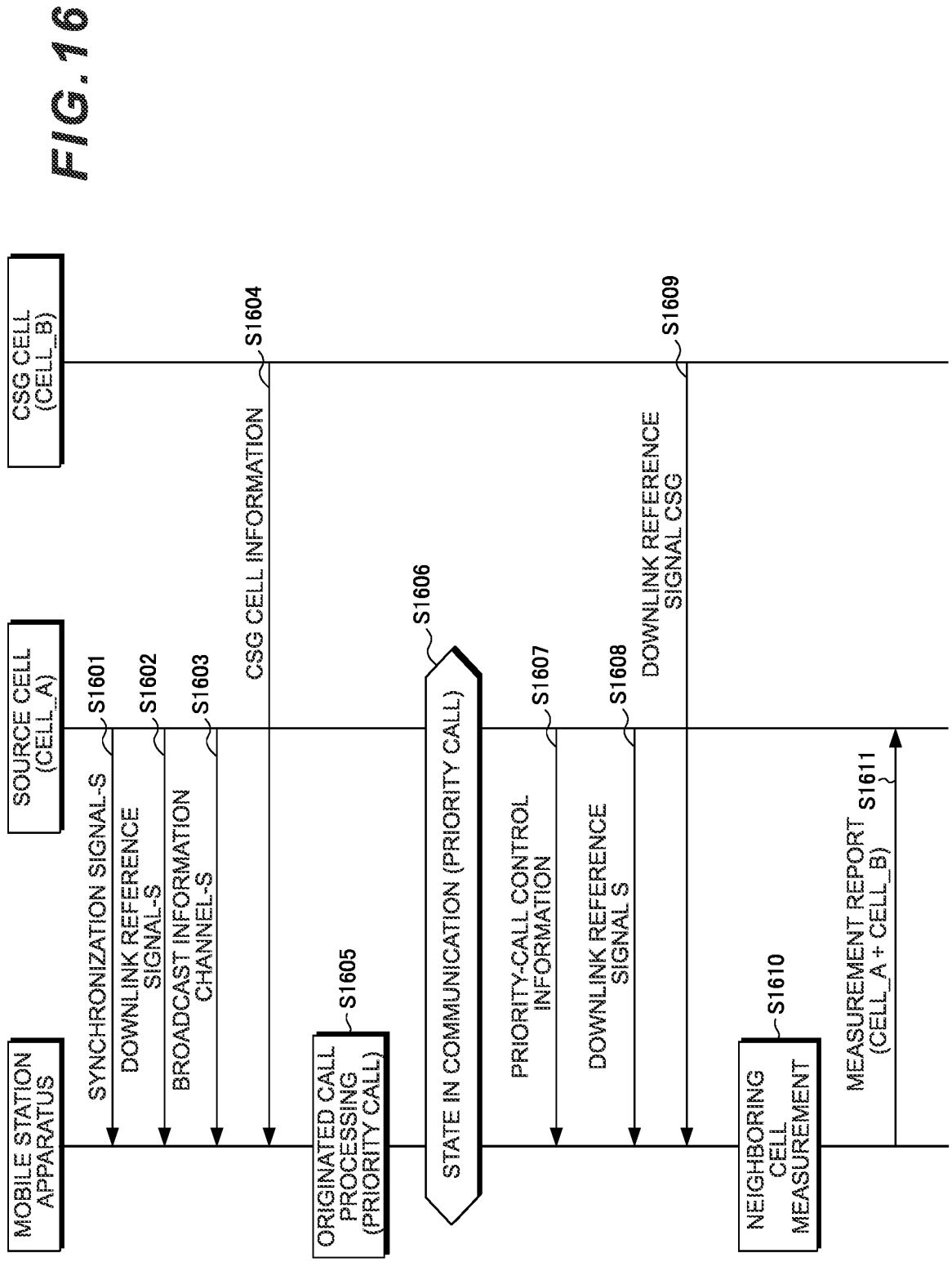
FIG. 16 is a sequence chart illustrating about a processing procedure of neighboring cell measurement processing in the third embodiment in accordance with the invention.
Figure 17:
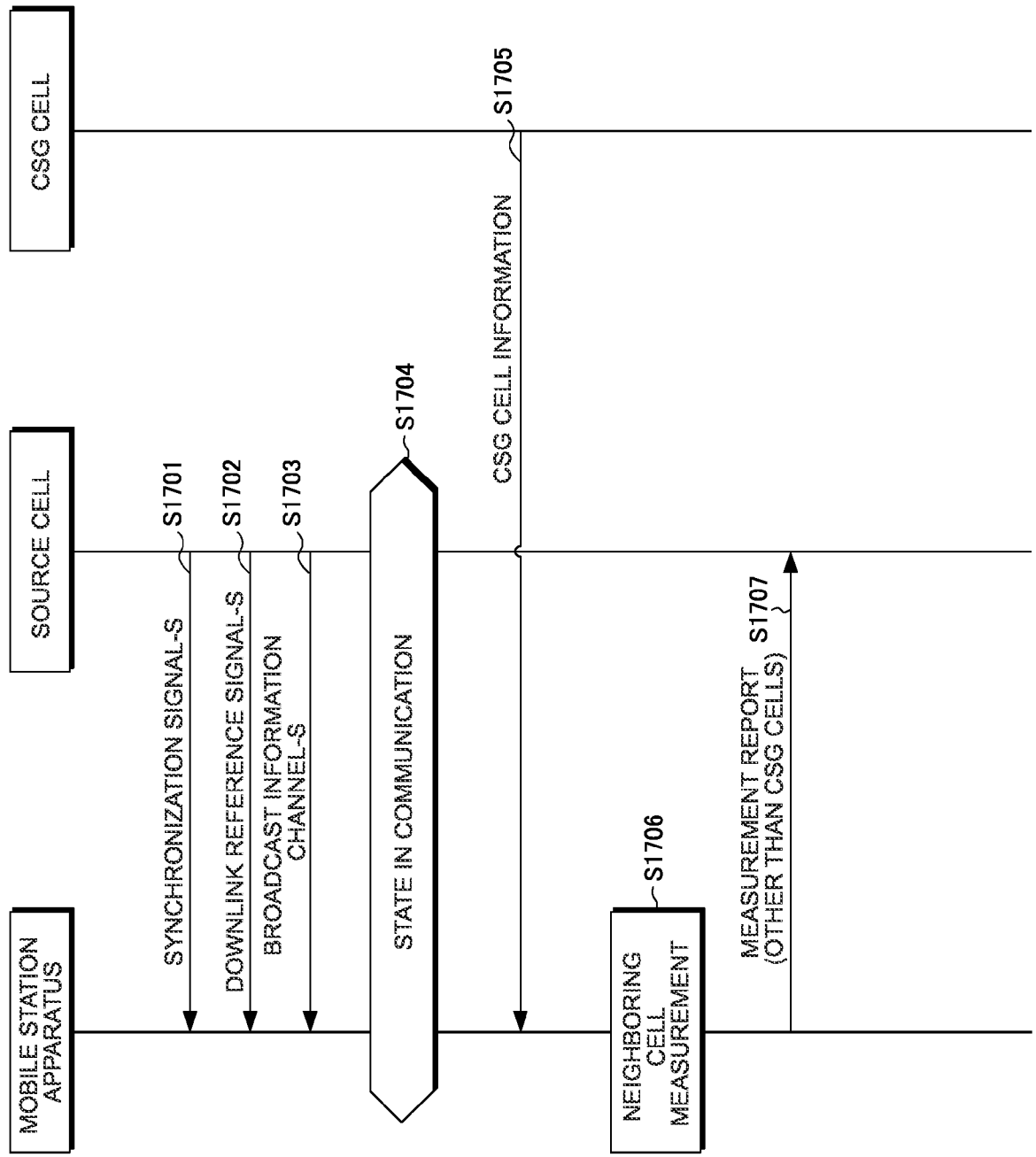
FIG. 17 is a sequence chart illustrating about conventional neighboring cell measurement and a conventional measurement report.
Figure 18:
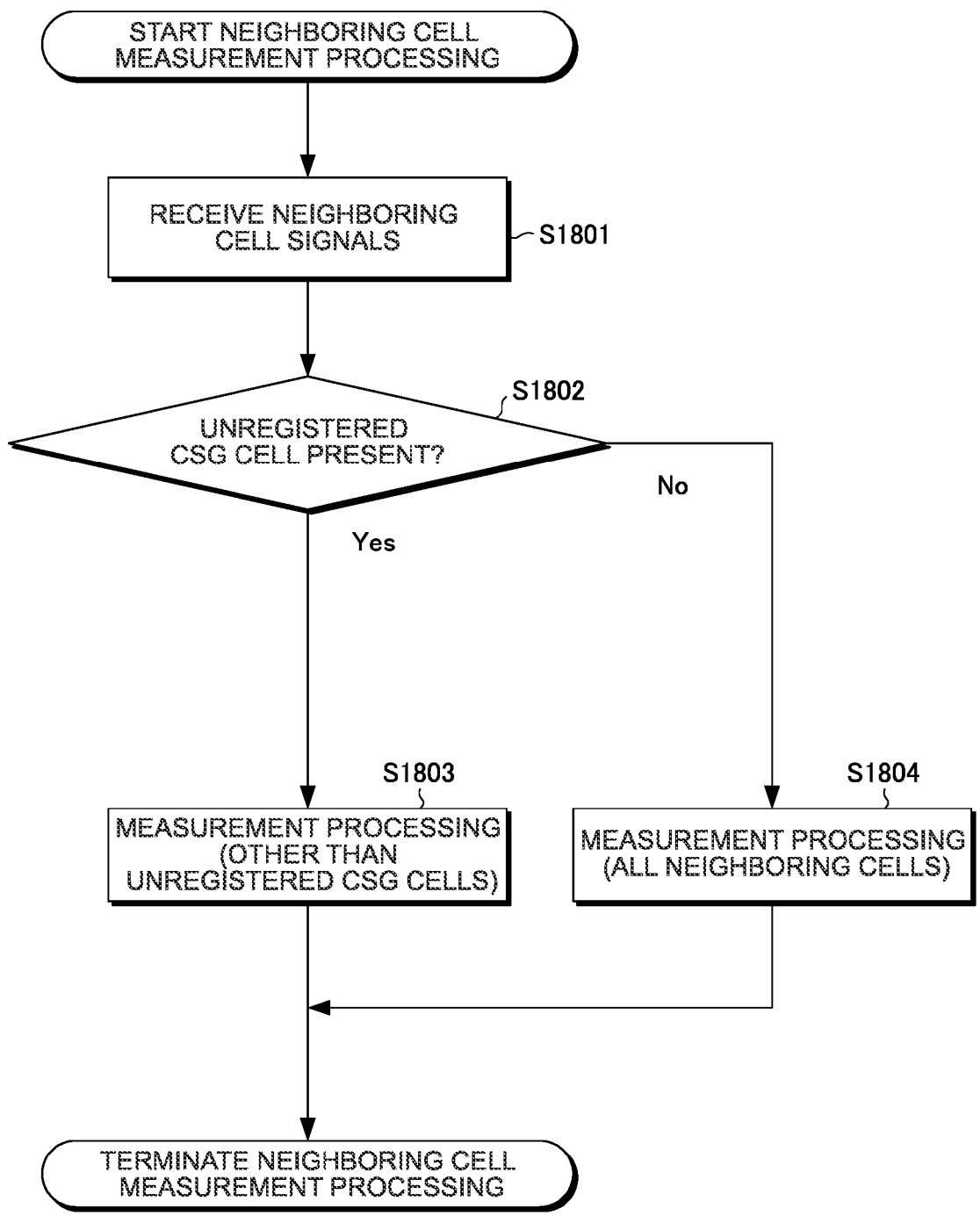
FIG. 18 is a flowchart showing a processing procedure of neighboring cell measurement processing during communication in a conventional mobile station apparatus.

FIG. 16 is a sequence chart showing a procedure of neighboring cell measurement in a priority call communication state and the measurement report procedure in the third embodiment. In FIG. 16, up to the time when the mobile station apparatus performs originated call processing (priority call) upon a originated call request of a priority call and becomes in a state of communication (active state) with the source cell (cell_A), the process is the same as that in FIG. 5 (steps S1601 to S1605). In a state that the mobile station apparatus is in the priority call communication (step S1606), the source cell transmits priority-call control information (step S1607). The priority-call control information is transmitted in a layer-3 signaling message, using a broadcast information channel or a downlink data channel.

The mobile station apparatus changes the control so as to make the downlink reference signals of peripheral base station apparatuses indicated in the received priority-call control information be objects of measurement (steps S1608 and S1609). That is, a cell indicated in information on a peripheral base station apparatus is subjected to neighboring cell measurement processing regardless of the cell type thereof (step S1610). Then, a measurement result obtained by the measurement processing is included in a measurement report message to be transmitted to the source cell (cell_A) (step S1611). FIG. 16 shows a case where the CSG cell (cell_B) is indicated in peripheral base station information, wherein downlink reference signals which are made by the mobile station apparatus to be measurement objects are a downlink reference signal-s from the source cell (cell_A) (step S1608) and a downlink reference signal-csg from the CSG cell (cell_B) (step S1609).

In FIG. 16, other channels transmitted from CSG cells are omitted. Further, when a list (also called a black list) of inappropriate neighboring cells as a handover destination is notified from the base station apparatus, measurement processing on the inappropriate cells may be stopped. Further, as neighboring cell information indicated in information on peripheral base station apparatus, a plurality of pieces of cell information may be individually indicated, or a frequency band to be measured may be indicated. Still further, the cells_A to B may be allocated to respective different frequencies or may be based on different communication methods.

As has been described above, in the third embodiment, for the mobile station apparatus, cells to be objects of measurement in a priority call communication state are indicated in peripheral base apparatus information by the base station apparatus, and the mobile station apparatus can perform neighboring cell measurement of the indicated cells. Further, the base station apparatus transmits, to the mobile station apparatus, information on peripheral base station apparatuses being appropriate handover destinations. Still further, the base station apparatus receives a measurement report message transmitted by the mobile station apparatus, and decides the mobility control of the mobile station apparatus, such as handover, based on the measurement report information.

Further, in the third embodiment, for the mobile station apparatus, neighboring cells to be objects of measurement are indicated in the priority call communication state, unnecessary measurement report information is not transmitted to the base station apparatus, and thereby the measurement efficiency by the mobile station apparatus is improved and the power consumption is reduced. Yet further, because appropriate peripheral base station apparatuses are provided as handover destinations, the success probability of handover is increased, and the communication quality is improved.

(A) Further, in accordance with the invention, the following embodiment is also applicable. That is, a mobile station apparatus in accordance with the invention can be applied to a mobile communication system that includes a small base station apparatus which makes, in normal case, only mobile station apparatuses registered in advance accessible, and on the other hand, makes, in emergency case, unregistered mobile station apparatuses accessible, wherein the mobile station apparatus selects whether or not to perform measurement of the channel state between the mobile station apparatus and the small base station apparatus, according to the priority of communication.

In such a manner, as a mobile station apparatus selects, according to the priority of communication, whether or not to perform measurement of the channel state between the mobile station apparatus and a small base station apparatus, unnecessary measurement of the channel state between the mobile station apparatus and a small base station apparatus and unnecessary handover are restricted, and the power consumption by the mobile station apparatus is reduced, and on the other hand, necessary measurement of the channel state between the mobile station apparatus and a small base station apparatus can be performed. As a result, the range of coverage can be widened, and a call loss and a call disconnection can be avoided.

(B) Further, in performing reconnection, the mobile station apparatus in accordance with the invention selects whether or not to perform measurement of the channel state between the mobile station apparatus and the small base station apparatus, according to the priority of communication having been performed just before.

In such a manner, in performing reconnection, as the mobile station apparatus selects whether or not to perform measurement of the channel state between the mobile station apparatus and the small base station apparatus, according to the priority of the communication having been performed just before, unnecessary measurement of the channel state between the mobile station apparatus and a small base station apparatus and unnecessary handover are restricted, and the power consumption by the mobile station apparatus is restricted, and on the other hand, necessary measurement of the channel state between the mobile station apparatus and a small base station apparatus can be performed. As a result, the range of coverage can be widened, and a call loss and a call disconnection can be avoided.

(C) Still further, when the priority of the above-described communication is high, the mobile station apparatus in accordance with the invention performs measurement of the channel state between the mobile station apparatus and the small base station apparatus, and on the other hand, when the priority of the communication is low, the mobile station apparatus does not perform measurement of the channel state between the mobile station apparatus and the small base station apparatus.

In such a manner, when the priority of communication is high, the mobile station apparatus performs measurement of the channel state between the mobile station apparatus and the small base station apparatus, and on the other hand, when the priority of the communication is low, the mobile station apparatus does not perform measurement of the channel state between the mobile station apparatus and the small base station apparatus. Consequently, for a priority call, an unregistered small base station apparatus can be made an object of measurement of the channel state so that call disconnection can be avoided. On the other hand, for a call that is not a priority call, unnecessary measurement information on the channel state is not transmitted to the base station apparatus, which improves the efficiency of measurement of the channel and reduces the power consumption.

(D) Yet further, when communication has been normally terminated, the mobile station apparatus in accordance with the invention does not perform measurement of the channel state between the mobile station apparatus and the small base station apparatus.

In such a manner, when communication has been normally terminated, the mobile station apparatus does not perform measurement of the channel state between the mobile station apparatus and the small base station apparatus. Consequently, unnecessary measurement information on the state of the channel is not transmitted to the base station apparatus, which improves the efficiency of measurement of the channel and reduces the power consumption.

(E) Further, the mobile station apparatus in accordance with the invention includes at least a cell information management section that outputs cell type determination information for distinguishing a normal base station apparatus from the small base station apparatus, and a reception signal processing section that selects whether or not to perform measurement of the state of the transfer path between the mobile station apparatus and the small base station apparatus, based on the cell type determination information and access-class information indicating the priority of communication, and performs measurement of the channel state, corresponding to a result of the selection.

In such a manner, the mobile station apparatus selects whether or not to perform measurement of the channel state between the mobile station apparatus and the small base station apparatus, based on the cell type determination information and access-class information indicating the priority of communication, and performs measurement of the channel state, corresponding to a result of the selection. Consequently, unnecessary measurement of the channel state between the mobile station apparatus and a small base station apparatus and unnecessary handover are restricted, and the power consumption by the mobile station apparatus is reduced, while necessary measurement of the channel state between the mobile station apparatus and a small base station apparatus can be performed. As a result, the range of coverage can be widened, and a call loss and a call disconnection can be avoided.

(F) Still further, the mobile station apparatus in accordance with the invention is applied to a mobile communication system that includes a small base station apparatus which makes only mobile station apparatuses, which have been registered in advance, accessible in a case of a normal call, and on the other hand, makes mobile station apparatuses, which have not been registered, accessible in a case of a priority call. When the mobile station apparatus has received priority-call control information from a base station apparatus in a priority call communication, the information indicating that the small base station apparatus is selectable as a base station apparatus of a handover destination, the mobile station apparatus performs measurement of the channel state between the mobile station apparatus and the small base station apparatus.

In such a manner, when the mobile station apparatus has received priority-call control information from a base station apparatus in a priority call communication, the information indicating that the small base station apparatus is selectable as a base station apparatus of a handover destination, the mobile station apparatus performs measurement of the channel state between the mobile station apparatus and the small base station apparatus. Consequently, it is possible to perform effective measurement of the channel state.

(G) Yet further, a base station apparatus in accordance with the invention is applied to a mobile communication system that includes a small base station apparatus which makes only mobile station apparatuses, which have been registered in advance, accessible in a case of a normal call, and on the other hand, makes mobile station apparatuses, which have not been registered, accessible in a case of a priority call. The base station apparatus includes: a priority-call control information generation section that, in a case where access-class information indicating the priority of the communication of the mobile station apparatus includes information indicating a priority call as the call type, generates priority-call control information that at least indicates selectability of the small base station apparatus as a base station apparatus of a handover destination; and a transmission section that transmits the priority-call control information to the mobile station apparatus.

In such a manner, the base station apparatus, in a case where access-class information indicating the priority of the communication of the mobile station apparatus includes information indicating a priority call as the call type, generates priority-call control information that at least indicates selectability of the small base station apparatus as a base station apparatus of a handover destination; and transmits the generated priority-call control information to the mobile station apparatus. Consequently, it is possible to notify the mobile station apparatus of an appropriate handover destination.

(H) Further, a mobile communication system in accordance with the invention includes: a small base station apparatus that makes only mobile station apparatuses, which have been registered in advance, accessible in normal case, and on the other hand, makes unregistered mobile station apparatuses accessible in non-normal case; any one of the mobile station apparatuses described in above (A) to (E); and a base station apparatus.

By this configuration, selection as to whether to perform measurement of the channel state between the mobile station apparatus and the small base station apparatus is made depending on the priority of communication. Consequently, unnecessary measurement of the channel state between the mobile station apparatus and a small base station apparatus and unnecessary handover are restricted, and the power consumption by the mobile station apparatus is reduced, while necessary measurement of the channel state between the mobile station apparatus and a small base station apparatus can be performed. As a result, the range of coverage can be widened, and a call loss and a call disconnection can be avoided.

(I) Still further, a mobile communication system in accordance with the invention includes: a small base station apparatus that makes only mobile station apparatuses, which have been registered in advance, accessible in normal case, and on the other hand, makes unregistered mobile station apparatuses accessible in non-normal case; the mobile station apparatus described in above (F); and the base station apparatus described in above (G).

By this configuration, when the mobile station apparatus has received priority-call control information from a base station apparatus in a priority call communication, the information indicating that the small base station apparatus is selectable as a base station apparatus of a handover destination, the mobile station apparatus performs measurement of the channel state between the mobile station apparatus and the small base station apparatus. Consequently, it is possible to perform effective measurement of the channel state.

In accordance with the invention, it is possible to prepare a plurality of methods of measuring neighboring cells, corresponding to the priority of communication by a mobile station apparatus, and provide a method of switching them. Further, it is possible to provide a method of measuring the reception quality of neighboring cells by the mobile station apparatus and a reporting method, and a base station apparatus, a mobile station apparatus, a mobile communication system, a program, and a recording medium, which realize these methods.

In the foregoing embodiments, a mobile station apparatus and a base station apparatus may be controlled by recording, in a computer readable recording medium, a program for realizing the functions of the respective sections of the mobile station apparatus and the base station apparatus, or a part of these functions, and having a computer system read the program recorded in the recording medium and execute the program. The 'a computer system' referred to herein is assumed to include an OS and hardware, such as peripheral devices. Further, 'a computer readable recording medium' refers to a movable medium, such as a flexible disk, a photo-magnetic disk, a ROM, a CD-ROM, etc., or a storage device, such as a hard disk, incorporated in the computer system. Still further, 'a computer readable recording medium' is assumed to include a thing that dynamically holds a program during a short time, such as communication lines for a case of transmitting a program via communication lines of a network including the Internet, telephone lines, or the like, and a thing that holds the program for a certain time, such as a volatile memory inside a computer system as a server or a client in the above-described case. Yet further, the above-described program may be one that realizes a part of the above-described functions, or may be one that realizes the above-described functions by a combination with a program already recorded in the computer system.

Embodiments in accordance with the invention have been described above, referring to the drawings, however, concrete configuration is not limited to these embodiments, and design and the like that do not depart from the spirit of the invention are included in the scope of claim for patent.

REFERENCE NUMERALS

100 reception device
101 reception section
102 reception signal processing section
103 cell information management section
104 measurement information management section 105 antenna
200 transmission device
201 measurement report message generation section
202 transmission signal processing section
203 transmission section
204 antenna
300 reception device
301 reception section
302 reception signal processing section
303 measurement report message processing section
304 antenna
400 transmission device
401 CSG cell information generation section
402 access-restriction information management section
403 transmission signal processing section
404 transmission section
405 antenna
800 reception device
801 reception section
802 reception signal processing section
803 cell information management section
804 measurement information management section
805 reconnection cell selection section
806 antenna
900 transmission device
901 reconnection request message generation section
902 transmission signal processing section
903 transmission section
904 antenna
1000 reception device
1001 reception section
1002 reception signal processing section
1003 reconnection request message processing section
1004 antenna
1500 transmission device
1501 CSG cell information generation section
1502 access-restriction information management section
1503 priority-call control information generation section
1504 transmission signal processing section
1505 transmission section
1506 antenna

The invention claimed is:

1. A mobile station apparatus applied to a mobile communication system that includes a first base station apparatus capable of restricting an access of a normal call from the mobile station apparatus having not been registered and a second base station apparatus other than the first base station, the mobile station apparatus comprising:
 a processing unit configured to be able to restrict an access to the first base station apparatus or the second base station apparatus by an access class, wherein the access class is used for determination of a priority of a communication of the mobile station apparatus and the access class is a first access class applied for an emergency call or a second access class applied for a normal call; and
 perform cell selection to determine an appropriate cell as a cell of a reconnection destination in a reconnection procedure trying to reestablish radio connection with either the first base station apparatus or the second base station apparatus, wherein
  the reconnection procedure is started by the mobile station apparatus after the communication with the first base station apparatus or the second base station has failed, and
  the cell selection in the reconnection procedure is performed, on the basis of:
   measurement results of cells,
   the access class, and
   information acquired from broadcast information, indicating whether each access to the measured cells in each access class of the mobile station apparatus is restricted, and
  in the cell selection, the cell of the first base station apparatus and the cell of the second base station apparatus can be determined to be appropriate cells as a cell of a reconnection destination, in the case that the first access class is applied to the failed communication.

2. The mobile station apparatus according to claim 1, wherein
 in the case that communication with said previously-connected base station apparatus has failed to terminate normally, if said mobile station apparatus is performing communication in said second access class, said mobile station apparatus determines the cell of said first base station apparatus to be an inappropriate cell as a cell of a reconnection destination and determines the cell of said second base station apparatus to be an appropriate cell as a cell of a reconnection destination, and performs cell selection in said reconnection procedure.

3. The mobile station apparatus according to claim 2, wherein in said cell selection performed in the case that communication based on said first access class has failed to terminate normally, when a cell in which said measurement result is the best is a cell of said first base station apparatus among cells of said first base station apparatus where communication of said first access class by said mobile station apparatus is not prohibited and cells of said second base station apparatus where communication of said first access class by said mobile station apparatus is not prohibited, selected is a cell of a first base station apparatus in which said measurement result is the best.

4. A mobile communication system comprising:
 a plurality of base station apparatuses; and
 a mobile station apparatus configured to communicate with one of said base station apparatuses, wherein
 the plurality of base station apparatuses including:
  a first base station apparatus, of the plurality of base station apparatuses, capable of restricting an access of a normal call from a mobile station apparatus having not been registered, and
  a second base station apparatus other than the first base station,
 said mobile station apparatus; including:
 a processing unit configured to be able to restrict an access to the first base station apparatus or the second base station apparatus by an access class, wherein the access class is used for determination of a priority of a communication of the mobile station apparatus and the access class is a first access class applied for an emergency call or a second access class applied for a normal call; and
 perform cell selection to determine an appropriate cell as a cell of a reconnection destination in a reconnection procedure trying to reestablish radio connection with either the first base station apparatus or the second base station apparatus, wherein
  the reconnection procedure is started by the mobile station apparatus after the communication with the first base station apparatus or the second base station has failed, and
  the cell selection in the reconnection procedure is performed, on the basis of:
   measurement results of cells,
   the access class, and information acquired from broadcast information, indicating whether each access to the measured cells in each access class of the mobile station apparatus is restricted, and in the cell selection, the cell of the first base station apparatus and the cell of the second base station apparatus can be determined to be appropriate cells as a cell of a reconnection destination, in the case that the first access class is applied to the failed communication.

5. The mobile communication system according to claim 4, wherein in the case that communication between said one base station apparatus and said mobile station apparatus has failed to terminate normally, if said mobile station apparatus is performing communication in said second access class, said mobile station apparatus determines the cell of said first base station apparatus to be an inappropriate cell as a cell of a reconnection destination and determines the cell of said second base station apparatus to be an appropriate cell as a cell of a reconnection destination, and performs cell selection in said reconnection procedure.

6. The mobile communication system according to claim 5, wherein in said cell selection performed in the case that communication based on said first access class has failed to terminate normally, when a cell in which said measurement result is the best is a cell of said first base station apparatus among cells of said first base station apparatus where communication of said first access class by said mobile station apparatus is not prohibited and cells of said second base station apparatus where communication of said first access class by said mobile station apparatus is not prohibited, selected is a cell of a first base station apparatus in which said measurement result is the best.

7. A processing method in a mobile station apparatus applied to a mobile communication system including a first base station apparatus capable of restricting an access of a normal call from the mobile station apparatus having not been registered and a second base station apparatus other than the first base station, the processing method in the mobile station configured to be able to restrict an access to the first base station apparatus or the second base station apparatus by an access class, wherein the access class is used for determination of a priority of a communication of the mobile station apparatus and the access class is a first access class applied for an emergency call or a second access class applied for a normal call, the processing method comprising:

performing cell selection to determine an appropriate cell as a cell of a reconnection destination in a reconnection procedure where said mobile station apparatus tries to reestablish radio connection with either the first base station apparatus or the second base station apparatus, wherein the reconnection procedure is started by the mobile station apparatus to determine an appropriate cell as a cell of a reconnection destination, and to determine an appropriate cell as a cell of a reconnection destination on the basis of:
measurement results of cells,
the access class used, and
information acquired from broadcast information, indicating whether each access to the measured cells in each access class of the mobile station apparatus is restricted, and the cell of the first base station apparatus and the cell of said second base station apparatus can be determined to be appropriate cells as a cell of a reconnection destination.

8. The processing method according to claim 7, wherein the case that communication with said previously-connected base station apparatus has failed to terminate normally, if said mobile station apparatus is performing communication in said second access class, said mobile station apparatus determines the cell of said first base station apparatus to be an inappropriate cell as a cell of a reconnection destination and determines the cell of said second base station apparatus to be an appropriate cell as a cell of a reconnection destination, and performs cell selection in said reconnection procedure.

9. The processing method of claim 8, wherein in said cell selection performed in the case that communication based on said first access class has failed to terminate normally, when a cell in which said measurement result is the best is a cell of said first base station apparatus among cells of said first base station apparatus where communication of said first access class by said mobile station apparatus is not prohibited and cells of said second base station apparatus where communication of said first access class by said mobile station apparatus is not prohibited, said mobile station apparatus selects a cell of a first base station apparatus in which said measurement result is the best.

10. A processor implemented in a mobile station apparatus applied to a mobile communication system, the mobile communication system including a first base station apparatus provided with restriction on an access of a normal call from a mobile station apparatus having not been registered in advance and a second base station apparatus without restriction on an access of a normal call from said mobile station apparatus, wherein the processor uses the processing method according to claim 7.

* * * * *